(12) United States Patent
Ella et al.

(10) Patent No.: US 8,195,401 B2
(45) Date of Patent: Jun. 5, 2012

(54) DYNAMIC PRODUCTION SYSTEM MANAGEMENT

(75) Inventors: Richard G. Ella, Houston, TX (US);
Andrew P. Russell, Aberdeenshire (GB);
Laurence Reid, Cypress, TX (US);
William D. Johnson, Austin, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 11/625,141

(22) Filed: Jan. 19, 2007

(65) Prior Publication Data
US 2007/0271039 A1 Nov. 22, 2007

Related U.S. Application Data

(60) Provisional application No. 60/760,708, filed on Jan. 20, 2006.

(51) Int. Cl.
*G01V 1/40* (2006.01)
(52) U.S. Cl. ......................................................... 702/13
(58) Field of Classification Search ................ 702/6, 12, 702/13; 703/9–10
See application file for complete search history.

(56) References Cited

U.S. PATENT DOCUMENTS

| | | | |
|---|---|---|---|
| 3,045,750 A | 7/1962 | Peters et al. |
| 3,760,362 A | 9/1973 | Copland et al. |
| 3,971,926 A | 7/1976 | Gau et al. |
| 4,461,172 A | 7/1984 | McKee et al. |
| 4,559,610 A | 12/1985 | Sparks et al. |
| 4,633,954 A | 1/1987 | Dixon et al. |
| 4,676,313 A | 6/1987 | Rinaldi |
| 4,685,522 A | 8/1987 | Dixon et al. |
| 4,721,158 A | 1/1988 | Merritt, Jr. et al. |
| 4,738,313 A | 4/1988 | McKee |
| 5,208,748 A | 5/1993 | Flores et al. |
| 5,442,730 A | 8/1995 | Bigus |
| 5,455,780 A | 10/1995 | Nguyen et al. |
| 5,531,270 A | 7/1996 | Fletcher et al. |
| 5,547,029 A | 8/1996 | Rubbo et al. |
| 5,565,862 A | 10/1996 | Hubbard et al. |
| 5,566,092 A | 10/1996 | Wang et al. |
| 5,597,042 A | 1/1997 | Tubel et al. |

(Continued)

FOREIGN PATENT DOCUMENTS

EP 1 679 424 A2 7/2006

(Continued)

OTHER PUBLICATIONS

S. Hsieh and C.-C. Chiang, "Manufacturing-to-Sale Planning Model for Fuel Oil Production," *The International Journal of Advanced Manufacturing Technology*, 2001, 18:303-311.

(Continued)

*Primary Examiner* — Aditya Bhat
(74) *Attorney, Agent, or Firm* — Fish & Richardson P.C.; Bradley A. Misley

(57) ABSTRACT

Data about operation of a well for extracting a product from the subterranean reservoir and at least one of a characteristic of a subterranean reservoir or operation of a processing and transport system upstream of a point of sale is received. A corrective action can be automatically initiated on at least one of the well or the processing and transport system in response to a difference between the received data and a specified operational objective. An adjustment to a model of the reservoir, the well, and the processing and transporting system can be automatically initiated in response to the received data.

30 Claims, 12 Drawing Sheets

U.S. PATENT DOCUMENTS

| | | | |
|---|---|---|---|
| 5,636,693 A | 6/1997 | Elmer | |
| 5,662,165 A | 9/1997 | Tubel et al. | |
| 5,706,892 A | 1/1998 | Aeschbacher, Jr. et al. | |
| 5,706,896 A | 1/1998 | Tubel et al. | |
| 5,710,726 A | 1/1998 | Rowney et al. | |
| 5,721,538 A | 2/1998 | Tubel et al. | |
| 5,730,219 A | 3/1998 | Tubel et al. | |
| 5,732,776 A | 3/1998 | Tubel et al. | |
| 5,764,515 A | 6/1998 | Guerillot et al. | |
| 5,767,680 A | 6/1998 | Torres-Verdin et al. | |
| 5,829,520 A | 11/1998 | Johnson | |
| 5,841,678 A | 11/1998 | Hasenberg et al. | |
| 5,842,149 A | 11/1998 | Harrell et al. | |
| 5,859,437 A | 1/1999 | Hsu et al. | |
| 5,871,047 A | 2/1999 | Spath et al. | |
| 5,873,049 A | 2/1999 | Bielak et al. | |
| 5,881,811 A | 3/1999 | Lessi et al. | |
| 5,959,547 A | 9/1999 | Tubel et al. | |
| 5,975,204 A | 11/1999 | Tubel et al. | |
| 5,979,558 A | 11/1999 | Bouldin et al. | |
| 5,992,519 A | 11/1999 | Ramakrishnan et al. | |
| 6,002,985 A | 12/1999 | Stephenson | |
| 6,021,377 A | 2/2000 | Dubinsky et al. | |
| 6,021,662 A | 2/2000 | Moulu et al. | |
| 6,022,985 A | 2/2000 | Authelin et al. | |
| 6,023,656 A | 2/2000 | Cacas et al. | |
| 6,076,046 A | 6/2000 | Vasudevan et al. | |
| 6,088,656 A | 7/2000 | Ramakrishnan et al. | |
| 6,095,262 A | 8/2000 | Chen | |
| 6,098,020 A | 8/2000 | den Boer | |
| 6,101,447 A | 8/2000 | Poe, Jr. | |
| 6,112,126 A | 8/2000 | Hales et al. | |
| 6,112,817 A | 9/2000 | Voll et al. | |
| 6,176,323 B1 | 1/2001 | Weirich et al. | |
| 6,182,756 B1 | 2/2001 | Garcia et al. | |
| 6,192,980 B1 | 2/2001 | Tubel et al. | |
| 6,236,894 B1 | 5/2001 | Stoisits et al. | |
| 6,266,619 B1 | 7/2001 | Thomas et al. | |
| 6,281,489 B1 | 8/2001 | Tubel et al. | |
| 6,282,452 B1 | 8/2001 | DeGuzman et al. | |
| 6,356,844 B2 | 3/2002 | Thomas et al. | |
| 6,397,946 B1 | 6/2002 | Vail, III | |
| 6,412,555 B1 | 7/2002 | Sten-Halvorsen et al. | |
| 6,422,312 B1 | 7/2002 | Delatorre et al. | |
| 6,424,919 B1 | 7/2002 | Moran et al. | |
| 6,434,435 B1 | 8/2002 | Tubel et al. | |
| 6,442,445 B1 | 8/2002 | Bunkofske et al. | |
| 6,516,293 B1 | 2/2003 | Huang et al. | |
| 6,549,879 B1 | 4/2003 | Cullick et al. | |
| 6,584,368 B2 | 6/2003 | Bunkofske et al. | |
| 6,609,079 B1 | 8/2003 | Seitlinger | |
| 6,662,109 B2 | 12/2003 | Roggero et al. | |
| 6,678,569 B2 | 1/2004 | Bunkofske et al. | |
| 6,701,514 B1 | 3/2004 | Haswell et al. | |
| 6,823,296 B2 | 11/2004 | Rey-Fabret et al. | |
| 6,826,483 B1 | 11/2004 | Anderson et al. | |
| 6,853,921 B2 | 2/2005 | Thomas et al. | |
| 6,871,118 B2 | 3/2005 | Henriot et al. | |
| 6,890,940 B2 * | 5/2005 | Ishiwata et al. | 514/332 |
| 6,954,737 B2 | 10/2005 | Kalantar et al. | |
| 6,980,940 B1 | 12/2005 | Gurpinar et al. | |
| 6,985,750 B1 | 1/2006 | Vicknair et al. | |
| 7,027,968 B2 | 4/2006 | Choe et al. | |
| 7,047,170 B2 | 5/2006 | Feldman et al. | |
| 7,054,752 B2 | 5/2006 | Zabalza-Mezghani et al. | |
| 7,062,420 B2 | 6/2006 | Poe, Jr. | |
| 7,072,809 B2 | 7/2006 | Egermann et al. | |
| 7,079,952 B2 | 7/2006 | Thomas et al. | |
| 7,096,092 B1 | 8/2006 | Ramakrishnan et al. | |
| 7,200,533 B2 | 4/2007 | Hu et al. | |
| 7,266,456 B2 | 9/2007 | De Guzman et al. | |
| 7,277,836 B2 | 10/2007 | Netemeyer et al. | |
| 7,357,196 B2 | 4/2008 | Goldman et al. | |
| 7,373,976 B2 | 5/2008 | Casey | |
| 7,379,853 B2 | 5/2008 | Middya | |
| 7,389,185 B2 | 6/2008 | Craig | |
| 7,434,619 B2 | 10/2008 | Rossi et al. | |
| 7,620,534 B2 * | 11/2009 | Pita et al. | 703/10 |
| 2002/0049625 A1 | 4/2002 | Kilambi et al. | |
| 2002/0165671 A1 | 11/2002 | Middya | |
| 2003/0167157 A1 | 9/2003 | Mougin et al. | |
| 2004/0104027 A1 | 6/2004 | Rossi et al. | |
| 2004/0148147 A1 | 7/2004 | Martin | |
| 2004/0153437 A1 | 8/2004 | Buchan | |
| 2004/0220790 A1 | 11/2004 | Cullick et al. | |
| 2004/0230413 A1 | 11/2004 | Chen | |
| 2004/0236553 A1 | 11/2004 | Chen et al. | |
| 2004/0254734 A1 | 12/2004 | Zabalza-Mezghani et al. | |
| 2005/0010384 A1 | 1/2005 | Rheem et al. | |
| 2005/0038603 A1 | 2/2005 | Thomas et al. | |
| 2005/0096893 A1 | 5/2005 | Feraille et al. | |
| 2005/0149307 A1 | 7/2005 | Gurpinar et al. | |
| 2005/0194131 A1 * | 9/2005 | Tseytlin | 166/250.07 |
| 2005/0267718 A1 | 12/2005 | Guyaguler et al. | |
| 2005/0267771 A1 | 12/2005 | Biondi et al. | |
| 2005/0273301 A1 | 12/2005 | Huang | |
| 2005/0273303 A1 | 12/2005 | Flandrin et al. | |
| 2006/0085174 A1 | 4/2006 | Hemanthkumar et al. | |
| 2006/0116856 A1 | 6/2006 | Webb | |
| 2006/0149520 A1 | 7/2006 | Le Ravalec-Dupin et al. | |
| 2006/0224369 A1 | 10/2006 | Yang et al. | |
| 2007/0078637 A1 | 4/2007 | Martin et al. | |
| 2007/0112547 A1 | 5/2007 | Ghorayeb et al. | |
| 2007/0179766 A1 | 8/2007 | Cullick et al. | |
| 2007/0179767 A1 | 8/2007 | Cullick et al. | |
| 2007/0179768 A1 | 8/2007 | Cullick et al. | |
| 2007/0192072 A1 | 8/2007 | Cullick et al. | |
| 2007/0198223 A1 | 8/2007 | Ella et al. | |
| 2007/0265815 A1 | 11/2007 | Couet et al. | |
| 2007/0271077 A1 | 11/2007 | Kosmala et al. | |
| 2007/0295501 A1 | 12/2007 | Poulisse | |
| 2008/0077371 A1 | 3/2008 | Yeten et al. | |
| 2008/0082469 A1 | 4/2008 | Wilkinson et al. | |
| 2008/0091396 A1 | 4/2008 | Kennon et al. | |
| 2008/0133194 A1 | 6/2008 | Klumpen et al. | |
| 2008/0133550 A1 | 6/2008 | Orangi et al. | |
| 2008/0154505 A1 | 6/2008 | Kim et al. | |
| 2008/0162100 A1 | 7/2008 | Landa | |
| 2008/0249906 A1 | 10/2008 | Landis, Jr et al. | |
| 2008/0270328 A1 | 10/2008 | Lafferty et al. | |
| 2008/0275594 A1 | 11/2008 | de Guzman | |
| 2008/0288226 A1 | 11/2008 | Gurpinar et al. | |

FOREIGN PATENT DOCUMENTS

| | | |
|---|---|---|
| GB | 2320731 | 7/1998 |
| WO | WO 97/41330 | 11/1997 |
| WO | WO 97/49894 | 12/1997 |
| WO | WO 98/07049 | 2/1998 |
| WO | WO 98/12417 | 3/1998 |
| WO | WO 98/37465 | 8/1998 |
| WO | WO 99/60247 | 11/1999 |
| WO | WO 02/054332 A1 | 7/2002 |
| WO | WO 02/063130 | 8/2002 |
| WO | WO 02/063130 A1 | 8/2002 |
| WO | WO 02/063403 A2 | 8/2002 |
| WO | WO 02/101555 A2 | 12/2002 |
| WO | WO 2004/049216 A1 | 6/2004 |
| WO | WO 2004/079144 A2 | 9/2004 |
| WO | WO 2004/095259 A1 | 11/2004 |
| WO | WO 2005/101060 | 10/2005 |

OTHER PUBLICATIONS

Marsh, Jack, et al., "*Wildcat Hills Gas Gathering System Case Studies: An Integrated Approach From Reservoir Development Through to Sales Pipeline Delivery*," Society of Petroleum Engineers, SPE 75698, Copyright 2002, 13 pages.

Liao, TonyTianlu, et al., "*Evaluating Operation Strategies via Integrated Asset Modeling*," Society of Petroleum Engineers, SPE 75525, Copyright 2002, Abstract Only, 2 pages.

Lobato-Barradas, Gerardo, et al., "*Integrated Compositional Surface-Subsurface Modeling for Rate Allocation Calculations*," Society of Petroleum Engineers, SPE 74382, Copyright 2002, Abstract Only, 1 page.

Zapata, V.J., et al., "*Advances in Tightly Coupled Reservoir/Wellbore/Surface-Network Simulation*," SPE Reservoir Evaluation & Engineering, vol. 4, No. 2, SPE 71120, Apr. 2001, pp. 114-120, Abstract Only, 3 pages.

Beliakova, N., et al., "*Hydrocarbon Field Planning Tool for Medium to Long Term Production Forecasting from Oil and Gas Fields Using Integrated Subsurface—Surface Models*," Society of Petroleum Engineers, SPE 65160, Copyright 2000, 5 pages.

Barroux, C.C., et al., "*Linking Reservoir and Surface Simulators: How to Improve the Coupled Solutions*," Society of Petroleum Engineers, SPE 65159, Copyright 2000, Abstract Only, 2 pages.

Litvak, M.L., et al., "*Simplified Phase-Equilibrium Calculations in Integrated Reservoir and Surface-Pipeline-Network Models*," SPE Journal, vol. 5, No. 2, SPE 64498, Jun. 2000, pp. 236-241, Abstract Only, 3 pages.

Weisenborn, A.J. (Toon), et al., "*Compositional Integrated Subsurface-Surface Modeling*," Society of Petroleum Engineers, SPE 65158, Copyright 2000, Abstract Only, 2 pages.

Tingas, John, "*Integrated Reservoir and Surface Network Simulation in Reservoir Management of Southern North Sea Gas Reservoirs*," Society of Petroleum Engineers, SPE 50635, Copyright 1998, Abstract Only, 2 pages.

Trick, M.D., "*A Different Approach to Coupling a Reservoir Simulator with a Surface Facilities*," Society of Petroleum Engineers, SPE 40001, Copyright 1998, Abstract Only, 1 page.

Hepguler, Gokhan, "*Integration of a Field Surface and Production Network With a Reservoir Simulator*," SPE Computer Applications, vol. 12, No. 4, SPE 38937, Jun. 1997, Abstract Only, 3 pages.

Deutman, Robert, et al., "*A Case Study of Integrated Gas Field System Modelling in the North Sea Environment*," Society of Petroleum Engineers, SPE 38556, Copyright 1997, Abstract Only, 2 pages.

Pieters, Johan, et al., "*Total System Modelling—A Tool for Effective Reservoir Management of Multiple Fields with Shared Facilities*," Society of Petroleum Engineers, SPE 30442, Copyright 1995, Abstract Only, 2 pages.

Litvak, M.L., et al., "*Surface Network and Well Tubing head Pressure Constraints in Compositional Simulation*," Society of Petroleum Engineers, SPE 29125, Copyright 1995, Abstract Only, 2 pages.

Haugen, E.D., et al., "*Simulation of Independent Reservoirs Couled by Global Production and Injection Constraints*," Society of Petroleum Engineers, SPE 29106, Copyright 1995, Abstract Only, 2 pages.

Halliburton, Drilling, Evaluation and Digital Solutions, Landmark, The Role and Development of the Operational Asset Optimization Model Within DecisionSpace for Production Solutions, White Paper, May 2007, 16 pages.

Laplante, Phillip, "*It Isn't Your Fathers Realtime Anymore*," System Performance, vol. 4, No. 1, Feb. 2006, 3 pages.

U.S. Appl. No. 11/704,369, filed Feb. 8, 2007, entitled "System and Method for Real Time Reservoir Management", inventors Jacob Thomas et al.

U.S. Appl. No. 12/121,710; filed May 15, 2008, entitled "Dynamic Production System Management", inventors Richard G. Ella et al.

Abstract of article entitled "Efficient Gradual Deformation Using a Streamline-Based Proxy Method," by Jef Caers, Journal of Petroleum Science and Engineering, V. 39, N. 1-2, Aug. 2003, p. 2 of Abstract Set 1.

Abstract of article entitled "A Comparison Study on Experimental Design and Response Surface Methodologies," by B. Yeten, et al., 2005 SPE Reservoir Simulation Symposium, Jan. 31-Feb. 2, 2005, pp. 3-4 of Abstract Set 1.

Abstract of article entitled, "Optimization of Well Placement in a Gulf of Mexico Waterflooding Project," by Baris Guyaguler, et al., SPE Annual Technical Conference and Exhibition, Oct. 1-4, 2000, pp. 5-6 of Abstract Set 1.

Abstract of article entitled "Application of Artificial Neural Networks for Reservoir Characterization With Limited Data," by K. Aminian, et al., Journal of Petroleum Science and Engineering, V. 49, N. 3-4, Dec. 15, 2005, pp. 7-8 of Abstract Set 1.

Abstract of article entitled "Recent Developments in Application of Artificial Intelligence in Petroleum Engineering," by Shahab D. Mohaghegh, Journal of Petroleum Technology, V. 57, N. 4, Apr. 2005, p. 9 of Abstract Set 1.

Abstract of article entitled "From Real Time Data to Production Optimization," by Christian Oberwinkler, et al., SPE Asia Pacific Conference on Integrated Modelling for Asset Management, Mar. 29-30, 2004, pp. 10-11 of Abstract Set 1.

Abstract of article entitled "New Tools for Fracture Design Optimization," by Christian Oberwinkler, et al., SPE International Symposium and Exhibition on Formation Damage Control, Feb. 18-20, 2004, p. 12 of Abstract Set 1.

Abstract of article entitled "Improving Gas Storage Development Planning Through Simulation-Optimization," by Virginia M. Johnson, et al., SPE Eastern Regional Conference Proceedings, Oct. 17-19, 2000, p. 13 of Abstract Set 1.

Abstract of article entitled "Obtain an Optimum Artificial Neural Network Model for Reservoir Studies," by Yuqi Du, et al., SPE Annual Technical Conference and Exhibition, Oct. 5-8, 2003, p. 14 of Abstract Set 1.

Abstract of article entitled "Applied Production Optimization: I-Field," by Mahmut, Sengul, et al., Proceedings of the 2002 SPE Annual Technical Conference and Exhibition, Sep. 29-Oct. 2, 2002, pp. 15-16 of Abstract Set 1.

Abstract of article entitled "How Data-Driven Modeling Methods like Neural Networks Can Help to Integrate Different Types of Data into Reservoir Management," by M. Stundner, et al., SPE Middle East Oil Show, Mar. 17-20, 2001, p. 17 of Abstract Set 1.

Abstract of article entitled "Optimization of Nonconventional Well Type, Location, and Trajectory," by Burak Yeten, et al., SPE Journal, V. 8, N. 3, Sep. 2003, p. 18 of Abstract Set 1.

Abstract of article entitled "Process Neural Network With Time-Varied Input and Output Functions and Its Applications," by Xin-Gui He, et al., Ruan Jian Xue Bao/Journal of Software, V. 14, N. 4, Apr. 2003, p. 19 of Abstract Set 1.

Abstract of article entitled "Application of Neural Networks for Predictive Control in Drilling Dynamics," by D. Dashevskiy, et al., SPE Annual Technical Conference and Exhibition, 1999, p. 20 of Abstract Set 1.

Abstract of article entitled "Applications of Neural Networks in Multiwell Field Development," by A. Centilmen, et al., SPE Annual Technical Conference and Exhibition, V. 1, 1999, p. 21 of Abstract Set 1.

Abstract of article entitled "Applications of Soft Computing in Petroleum Engineering," by Andrew H. Sung, The International Society for Optical Engineering, V. 3812, 1999, p. 22 of Abstract Set I.

Abstract of U.S. Publication No. 2005/0010384, published Jan. 13, 2005, entitled Method of Simulating Fluctuation of Oil, Program of the Same and System of the Same, Inventors Rheem et al, p. 2 of Abstract Set 2.

Abstract of U.S. Patent No. 5,841,678, issued Nov. 24, 1998, entitled "Modeling and Simulation of a Reaction for Hydrotreating Hydrocarbon Oil," Inventors Hasenberg et al., p. 3 of Abstract Set 2.

Abstract of U.S. Patent No. 5,455,780, issued Oct. 3, 1995, entitled "Method of Tracking Material in a Well," Inventors Nguyen et al., p. 4 of Abstract Set 2.

Abstract of U.S. Patent No. 4,559,610, issued Dec. 17, 1985, entitled "Gas Pumping System Analog," Inventors Sparks et al., p. 5 of Abstract Set 2.

Abstract of U.S. Patent No. 3,971,926, issued Jul. 27, 1976, entitled "Simulator for an Oil Well Circulation System," Inventors Gau et al., p. 6 of Abstract Set 2.

Abstract of U.S. Publication No. 2005/0096893, published May 5, 2005, entitled Decision Support Method for Oil Reservoir Management in the Presence of Uncertain Technical and Economic Parameters, Inventors Feraille et al., p. 2 of Abstract Set 3.

Abstract of U.S. Publication No. 2002/0082815 A1, published Jun. 27, 2002, entitled "Method for Forming an Optimized Neural Network Module Intended to Simulate the Flow Mode of a Multiphase Fluid Stream," Inventors Rey-Fabret et al., pp. 3-4 of Abstract Set 3.

Abstract of U.S. Patent No. 6,823,296, issued Nov. 23, 2004, entitled "Method for Forming an Optimized Neural Network Module Intended to Simulate the Flow Mode of a Multiphase Fluid Stream," Inventors Rey-Fabret et al., pp. 3-4 of Abstract Set 3.

Abstract of U.S. Publication No. 2005/0267718 A1, published Dec. 1, 2005, entitled "Method for Field Scale Production Optimization by Enhancing the Allocation of Well Flow Rates," Inventors Guyaguler et al, p. 5 of Abstract Set 3.

Abstract of U.S. Publication No. 2004/0138862 A1, published Jul. 15, 2004, entitled Method for Rapid Formation of a Stochastic Model Representative of a Heterogeneous Underground Reservoir, Constrained by Dynamic Data, Inventors Hu et al., p. 6 of Abstract Set 3.

Abstract of U.S. Patent No. 6,826,483, issued Nov. 30, 2004, entitled "Petroleum Reservoir Simulation and Characterization System and Method," Inventors Anderson et al., p. 7 of Abstract Set 3.

Abstract of U.S. Publication No. 2004/0220790 A1, published Nov. 4, 2004, entitled Method and System for Scenario and Case Decision Management, Inventors Cullick et al., p. 8 of Abstract Set 3.

Abstract of U.S. Publication No. 2002/0166818 A1, published Nov. 14, 2002, entitled "Method for Detecting and Controlling Hydrate Dormation at any Point of a Pipe Carrying Multiphase Petroleum Fluids," Inventors Henriot et al., pp. 9-10 of Abstract Set 3.

Abstract of U.S. Patent No. 6,871,118, issued Mar. 22, 2005, entitled "Method for Detecting and Controlling Hydrate Formation at any Point of a Pipe Carrying Multiphase Petroleum Fluids," Inventors Henriot et al., pp. 9-10 of Abstract Set 3.

Abstract of U.S. Patent No. 6,112,817, issued Sep. 5, 2000, entitled "Flow Control Apparatus and Methods," Inventors Voll et al., p. 11 of Abstract Set 3.

Abstract of U.S. Patent No. 6,023,656, issued Feb. 2, 2000, entitled "Method for Determining the Equivalent Fracture Permeability of a Fracture Network in a Subsurface Multi-Layered Medium," Inventors Cacas et al., p. 12 of Abstract Set 3.

Alerting Abstract of WO 2001/023829, by A.S. Cullick, et al., Apr. 5, 2001, pp. 2-3 of Abstract Set 4.

Alerting Abstract of FR 2855631, by M. Emmanuel, et al., Dec. 3, 2004, pp. 4-5 of Abstract Set 4.

Alerting Abstract of GB 2364081, by D.P. Moran, et al., Jan. 16, 2002, p. 6 of Abstract Set 4.

Abstract of "An Example of a Steam Drive Pilot Project Management With 3D," Cursino da Silveira, et al., SPE/PA-CIM/CHOA Int Term. Oper & Heavy Oil Symp./Int Horizontal Well Technol Conf, Nov. 4-7, 2002, pp. 1-3 of Abstract Set 5.

Abstract of "Method for Enhancing Production Allocation in an Integrated Reservoir and Surface Flow System," U. Middya, World, Apr. 24, 2001, pp. 5-7 of Abstract Set 5.

Abstract of "Integrated Optimization and Control of the Production-Injection Operation Systems for Hydrocarbon Reservoirs," D. Yang, et al., J Petrol Sci Eng, V. 37, Nos. 1-2, Feb. 2003, pp. 7-9 of Abstract Set 5.

Abstract of "Intelligent Well Technology Maximizes Recovery, Reduces Costs: Emerging as Field Development Concept," M. Konopczynski, Offshore Int, V. 63, No. 1, Jan. 2003, pp. 9-11 of Abstract Set 5.

Abstract of "Characterization of Reservoir Fluid Dynamics from Multiple Downhole Permanent Sensors," Y. Manin, et al., $13^{TH}$ SPE Europe Petrol Conf, Oct. 29-31, 2002, pp. 11-13 of Abstract Set 5.

Abstract of "How Routine Reservoir Surveillance With Neural networks and Simplified Reservoir Models Can Convert Data Into Information," G.J. de Jonge, et al., $13^{TH}$ SPE Europe Petrol Conf, Oct. 29-31, 2002, pp. 13-15 of Abstract Set 5.

Abstract of "Maximizing Yibal's Remaining Value," Annu SPE Tech Conf, Sep. 29-Oct. 2, 2002, pp. 15-16 of Abstract Set 5.

Abstract of "Field/Reservoir Optimization Utilizing Neural Networks," B.H. Storm, Jr., et al., World, Mar. 21, 2001, pp. 18-20 of Abstract Set 5.

Abstract of "Logistic Approach in Using an Array of Reservoir Simulation and Probabilistic Models in Developing a Giant Oil Reservoir With Super-Permeability and Natural Fractures," T.R. Pham, et al., Annu SPE Tech Conf, Sep. 29-Oct. 2, 2002, pp. 20-22 of Abstract Set 5.

Abstract of "Object-Oriented Hydrocarbon Reservoir System Simulation," A.D. Banki, et al., World, Dec. 29, 2000, pp. 22-24 of Abstract Set 5.

Abstract of "Planning Oil Production," V.D. Lysenko, Neftepromysl Delo No. 1, Jan. 2002, pp. 24-26 of Abstract Set 5.

Abstract of "Integrated Reservoir Management in an Intelligent Well Environment," J.K. Martinez et al., SPE Asia Pacific Oil & Gas Conf, Oct. 8-10, 2002, pp. 28-30 of Abstract Set 5.

Abstract of "Leading in the Fourth Dimension," Petromin, V. 28, No. 4, May-Jun. 2002, pp. 30-32 of Abstract Set 5.

Abstract of "Maturing 4D Seismic in Breadth, Depth, and On Time," J. Stammeijer, et al., J Seismic Explor, V. 11, Nos. 1-2, May 2002, pp. 33-35 of Abstract Set 5.

Abstract of "Methodology for Water Injection Strategies Planning Optimization Using Reservoir Simulation," C.C. Mezzomo, $53^{RD}$ Annu Petrol Soc Cim Tech Mtg, Jun. 11-13, 2002, pp. 35-37 of Abstract Set 5.

Abstract of "Global Optimization of Production-Injection Operation Systems for Hydrocarbon Reservoirs," D. Yang, et al., $53^{RD}$ Annu Petrol Soc Cim Tech Mtg, Jun. 11-13, 2002, pp. 37-39 of Abstract Set 5.

Abstract of "Application of Reservoir Management Techniques to Improve Recovery From a Mature Waterflood Project in Sumatra," S. Bou-Mikael, et al., $28^{TH}$ Annu Indones Petrol Ass Conv, Feb. 26-28, 2002, pp. 40-42 of Abstract Set 5.

Abstract of "Earth Modeling Application for Reservoir Heat Management in Duri Field," Linawati Hazairin, et al., $28^{TH}$ Annu Indones Petrol Ass Conv, Feb. 26-28, 2002, pp. 42-44 of Abstract Set 5.

Abstract of "Well Planning and Design," Y. Jalali, et al., Gr Brit 2,368,600A, Sep. 28, 2000, pp. 44-47 of Abstract Set 5.

Abstract of "Near-Well Reservoir Monitoring Through Ensemble Kalman Filter," G. Naevdal, et al., $13^{TH}$ SPE/DOE Impr Oil Recovery Symp, Apr. 13-17, 2002, pp. 47-49 of Abstract Set 5.

Abstract of "Integrated Production Operation Models With Reservoir Simulation for Optimum Reservoir Management," D. Yang, et al., $13^{TH}$ SPE/DOE Impr Oil Recovery Symp, Apr. 13-17, 2002, pp. 49-50 of Abstract Set 5.

Abstract of "Production Optimization Methodology for Multilayer Commingled Reservoirs Using commingled Reservoir Production Performance Data and Production Logging Information," B.D. Poe, World, Oct. 4, 2000, pp. 51-52 of Abstract Set 5.

Abstract of "Managing a Multireservoir Field Using Single Cell Modeling—Dacion," M. Frorup, et al., SPE Int Petrol Conf in Mex, Feb. 10-12, 2002, pp. 53-55 of Abstract Set 5.

Abstract of "Setting the Value of Permanent Reservoir Monitoring and Control," J. Tyrie, World Oil, V. 223, No. 3, Mar. 2002, pp. 55-57 of Abstract Set 5.

Abstract of "Integrating Forward Modeling Into Reservoir Simulation," J.R. Fanchi, J Petrol Sci Eng, V. 32, No. 1, Dec. 1, 2001, pp. 57-58 of Abstract Set 5.

Abstract of "Dynamic Field Management Using Web-Based Remote Reservoir Modelling Technology," R.D. Barden, Petrol Soc CIM/CAN Int Petrol Conf, Jun. 12-14, 2001, pp. 60-62 of Abstract Set 5.

Abstract of "Estimates of Hydrocarbon Resources and Reserves and Petroleum Exploration and Production Scenario of India: An Overview," A.B. Dasgupta, ONGC Bull, V. 36, No. 2, Dec. 1999, pp. 62-64 of Abstract Set 5.

Abstract of "A Full Field Simulation Model of the Minagish Oolite Reservoir in Kuwait," S. Al-Mutairi, et al, NNU SPE Tech Conf, Oct. 3, 2001, pp. 64-66 of Abstract Set 5.

Abstract of "EOR (Enhanced Oil Recovery)—Yesterday, Today and Tomorrow," I. Singh, ONGC Bull, v. 36, No. 2, Dec. 1999, pp. 66-68 of Abstract Set 5.

Abstract of "Computer-Assisted Reservoir Management," A. Satter, et al., Pennwell Corp, 2000, pp. 68-70 of Abstract Set 5.

Abstract of "Reservoir Geomechanics: New Approach to Reservoir Engineering Analysis and a Powerful Tool for Reservoir Management," A. Settari, et al., $16^{TH}$ World Petrol Congr, Jun. 11-15, 2000, pp. 70-72 of Abstract Set 5.

Abstract of "On the Near Wellbore Modeling and Real Time Reservoir Manabement," O. Boe, et al., SPE Reservoir Simulation Symp, Feb. 11-14, 2001, pp. 72-73 of Abstract Set 5.

Abstract of "Integrated Reservoir Optimization," O.M.W. Gurpinar, et al., World, Feb. 22, 2000, pp. 75-77 of Abstract Set 5.

Abstract of "Reservoir Management Using Streamline Simulation," M.K. Choudhary, MS Thesis, Texas A&M Univ., 2000, pp. 77-79 of Abstract Set 5.

Abstract of "OSO Condensate Field Development, Offshore, Nigeria Reservoir Management Challenges," A.H. Membere, et al., $24^{TH}$ Annu SPE (Nigeria Council) Int Conf, Aug. 7-9, 2000, pp. 79-81 of Abstract Set 5.

Abstract of "Reservoir Management Decision-Making in the Presence of Geological Uncertainty," P.S. Da Cruz, Ph.D. Thesis, Stanford University, 2000, pp. 81-83 of Abstract Set 5.

Abstract of "Optimal Management of Advanced Wells Through Fast Updates of the Near-Well Reservoir Model," T. Mannseth, et al., $7^{TH}$ EAGE Europe Conf on the Math of Oil Recovery, Sep. 5-8, 2000, pp. 83-85 of Abstract Set 5.

Abstract of "Optimization Under Reservoir and Financial Uncertainty," B. Couet, et al., $7^{TH}$ EAGE Europe Conf on the Math of Oil Recovery, Sep. 5-8, 2000, pp. 85-86 of Abstract Set 5.

Abstract of "Visualization of Oil, Gas, and Water in the Subsurface," R.N. Anderson, et al., SPE Offshore Technol Conf, Apr. 30-May 3, 2001, pp. 86-88 of Abstract Set 5.

Abstract of "Apparatus and Method for Determining Oil Well Effluent Characteristics for Inhomogeneous Flow Conditions," F.J. Lynch, et al., World, Oct. 4, 1999, pp. 88-90 of Abstract Set 5.

Abstract of "The Use of a Simulation Model to Optimize Reservoir Management in a Very Mature 24Z reservoir, Elk Hills, California," J.G. Estremadoyro, SPE West Reg Mtg, Mar. 26-30, 2001, pp. 90-92 of Abstract Set 5.

Abstract of "Petroleum Production Optimization Utilizing Adaptive Network and Genetic Algorithm Techniques," R.F. Stoists, et al., US 6,236,894B1, Dec. 19, 1997, pp. 92-94 of Abstract Set 5.

Abstract of "Improving the Virtual Reservoir," J.O. Afilaka, et al., Oilfield Rev, V. 13, No. 1, Spring 2001, pp. 94-96 of Abstract Set 5.

Abstract of "How Data-Driven Modeling Methods Like Neural Networks Can Help to Integrate Different Types of Data in Reservoir Management," M. Stundner, et al., SPE Middle East Oil Show Conf, Mar. 17-20, 2001, pp. 96-98 of Abstract Set 5.

Abstract of "Empower™: New Reservoir Simulation System," B.L. Beckner, et al., SPE Middle East Oil Show Conf, Mar. 17-20, 2001, pp. 98-100 of Abstract Set 5.

Abstract of "Optimal Exploitation Scheme in MFB-5 Reservoir," M. Blanco, et al., SPE Int Thermo Per & Heavy Oil Symp, Mar. 12-14, 2001, pp. 100-102 of Abstract Set 5.

Abstract of "Controlling the Production—E.G. Depletion Rate—of a Hydrocarbon Well Using Remote Sensors and a Communication Network," R. Ciglenec, et al., Gr Brit 2,353,546A, Aug. 25, 1999, pp. 102-104 of Abstract Set 5.

Abstract of "System and Method for Real Time Reservoir Management," J. Thomas, et al., World, Jul. 20, 1999, pp. 104-106 of Abstract Set 5.

Abstract of "The Use of Streamline Simulation in Reservoir Management: Methodology and Case Studies," T. Lolomari, et al., Annu SPE Tech Conf, Oct. 1-4, 2000, pp. 106-108 of Abstract Set 5.

Abstract of "Integration of Computer-Aided High-Intensity Design With Reservoir Exploitation of Remote and Offshore Locations," L. Saputelli, et al., SPE Oil & Gas Int Conf in China, Nov. 7-10, 2000, pp. 108-110 of Abstract Set 5.

Abstract of "Application of Development Seismic to Infill Technique in Oilfield of Small Size of Sand Body," B. Fang, et al., SPE Asia Pacific Oil & Gas Conf, Oct. 16-18, 2000, pp. 110-111 of Abstract Set 5.

Abstract of "A Method for Increasing Recovery of Hydrocarbons," H. Lunde, World, Mar. 12, 1999, pp. 111-113 of Abstract Set 5.

Abstract of "Decision Analysis for Integrated Reservoir Management," R. Evans, SPE Europe Petrol Conf, Oct. 24-25, 2000, pp. 113-115 of Abstract Set 5.

Abstract of "New Mathematical Techniques for the Optimisation of Oil & Gas Production Systems," S. Handley-Schachler, et al., SPE Europe Petrol Conf, Oct. 24-25, 2000, pp. 115-117 of Abstract Set 5.

Abstract of "Predicting the Reservoir Response to Intelligent Wells," I.M. Thompson, et al., SPE Europe Petrol Conf, Oct. 24-25, 2000, pp. 117-119 of Abstract Set 5.

Abstract of "Waterflood Management: A Case Study of the Northwest Fault Block Area of Prudhoe Bay, Alaska, using Streamline Simulation and Traditional Waterflood Analysis," G.H. Grinestaff, et al., Annu SPE Tech Conf, Oct. 1-4, 2000, pp. 119-121 of Abstract Set 5.

Abstract of "Gas Management in a Large, Complex, Miscibly Flooded Oil Field," M.D. Dunn, et al., SPE Asia Pacific Conf, Apr. 25-26, 2000, pp. 121-123 of Abstract Set 5.

Abstract of "Post-Steamflood Reservoir Management Using a Full-Scale 3D Deterministic Thermal Reservoir Simulation Model, Wilmington Field, California," J.J. Mondragon, et al., SPE/AAPG West Reg Mtg, Jun. 19-23, 2000, pp. 125-127 of Abstract Set 5.

Abstract of "Lost Hills CO2 Pilot: Evaluation, Design, Injectivity Test Results, and Implementation," P.R. Perri, et al., SPE/AAPG West Reg Mtg, Jun. 19-23, 2000, pp. 127-129 of Abstract Set 5.

Abstract of "Optimization of Displacement Efficiency of Oil Recovery in Porous Media Using Optimal Control Theory," B. Sudaryanto, Ph.D. Thesis, Diss. Abstr. Int., Sect. B, V. 6, No. 5, Nov. 1999, pp. 129-131 of Abstract Set 5.

Abstract of "Multicomponent Monitoring," S. Roche, Hart's E&P, V. 72, No. 10, Oct. 1999, pp. 131-132 of Abstract Set 5.

Abstract of "An Ongoing Process," EUROIL, V. 10, No. 8, Aug. 1999, pp. 133-134 of Abstract Set 5.

Abstract of "Real Time Monitoring and Control of Downhole Reservoirs," T.S. Ramakrishnan, et al., US 5,992,519, Sep. 29, 1997, pp. 134-136 of Abstract Set 5.

Abstract of "Seligi Depletion Management," S. Selamat, et al., SPE Asia Pacific Impr Oil Recovery Conf, Oct. 25-26, 1999, pp. 136-138 of Abstract Set 5.

Abstract of "Reservoir Characterization and Modelling: A Framework for Field Development," J. Archer, Structural Geology in Reservoir Characterization, 1998, pp. 138-140 of Abstract Set 5.

Abstract of "Predicting 4D Seismic Performance Using an Integrated Flow Model," J.R. Fanchi, Annu SPE Tech Conf, Oct. 3-6, 1999, pp. 140-142 of Abstract Set 5.

Abstract of "Optimizing Well Numbers in Oil and Gas Fields," P.R.P. Cunningham, Gr Brit 2,332,227A, Mar. 3, 1999, pp. 142-143 of Abstract Set 5.

Abstract of "Better Rates of Recovery (Mejores Tasas De Recuperacion)," I.R. Ellul, Petrol Int, V. 57, No. 6, Sep.-Oct. 1998, pp. 143-145 of Abstract Set 5.

Abstract of "Use of Reservoir Simulation, Parallel Computing and Optimization Techniques to Accelerate History Matching and Reservoir Management Decisions," D.J. Schiozer, $6^{TH}$ SPE Latin Amer & Caribbean Petrol Eng Conf, Apr. 21-23, 1999, pp. 147-149 of Abstract Set 5.

Abstract of "Northeast Numbi Field (Cabinda, Angola) Calculated Risk Taking for Fast-Track Development," R.P. Schaaf, et al., $2^{ND}$ Annu Pennwell et al Offshore West Africa Conf, Nov. 18-20, 1997, pp. 149-151 of Abstract Set 5.

Abstract of "Oil Field Exploitation Management With the Aim to Increase Their Oil Recovery Ratio," O.I. Akulshin, et al., NAFT GAZ PROM, No. 6, Nov.-Dec. 1998, pp. 151-152 of Abstract Set 5.

Abstract of "Reservoir Conformance Approach and Management Practices for Improved Recovery Opportunities: Process and Case History," M.Y. Soliman, et al., $6^{TH}$ SPE Latin Amer & Caribbean Petrol Eng Conf, Apr. 21-23, 1999, pp. 152-154 of Abstract Set 5.

Abstract of "Identifying Opportunities to Increase Oil Recovery from Fluvial-Dominated Deltaic Reservoirs in Oklahoma," R.M. Knapp, et al., SPE Mid-Continent Oper Symp, Mar. 28-31, 1999, pp. 154-156 of Abstract Set 5.

Abstract of "Reservoir Management Using Production Data," T. Soeriawinata, et al., SPE Mid-Continent Oper Symp, Mar. 28-31, 1999, pp. 156-158 of Abstract Set 5.

Abstract of "Maximizing the Economic Performance of Oil and Gas Fields Through Technology and Teamwork: Key Elements for Creating Growth," D. Baille, et al., $26^{TH}$ Annu Indon Petrol Ass Conv, Oct. 27-29, 1998, pp. 158-159 of Abstract Set 5.

Abstract of "Optimized Reservoir Development Using High Angle Wells, El Furrial Field, Venezuela," R.W. Smith, et al., SPE Hydrocarbon Econ & Evaluation Symp, Mar. 20-23, 1999, pp. 159-161 of Abstract Set 5.

Abstract of "Rapid Assessment of Development Planning Options for Giant Oil Reservoirs in West Kuwait," T.A. Salam, et al., $11^{TH}$ SPE Middle East Oil Show Conf, Feb. 20-23, 1999, pp. 161-163 of Abstract Set 5.

Abstract of "Performance of Al Rayyan Field Under Aquifer Pressure Support," R.T. Burno, et al., $11^{TH}$ SPE Middle East Oil Show Conf, Feb. 20-23, 1999, pp. 163-165 of Abstract Set 5.

Abstract of "Deterministic Reservoir Simulation Approach for Targeting New Wells in a Reefal Mature Field," M.A. Nosseir, et al., 11$^{TH}$ SPE Middle East Oil Show Conf, Feb. 20-23, 1999, pp. 165-167 of Abstract Set 5.
Abstract of "Case Study: The Role of Simulation in Supporting Reservoir Management," A.M. Al-Yousif, et al., 11$^{TH}$ SPE Middle East Oil Show Conf, Feb. 20-23, 1999, pp. 167-169 of Abstract Set 5.
Abstract of "The Development Process; Zubair Reservoir, Raudhatain Field," H. Dashti, et al., 11$^{TH}$ SPE Middle East Oil Show Conf, Feb. 20-23, 1999, pp. 169-170 of Abstract Set 5.
Abstract of Disaggregating Reserve-to-Production Ratios: An Algorithm for United States Oil and Gas Reserve Development, C.W. Williams, Ph.D. Thesis, Diss. Abstr. Int., Sect. B, V. 59, No. 4, Oct. 1998, pp. 171-173 of Abstract Set 5.
Abstract of "From Pore to Pipeline, Field-Scale Solutions," A. Beamer, et al., Oilfield Rev, V. 10, No. 2, Summer 1998, pp. 173-174 of Abstract Set 5.
Abstract of "Integrated Waterflood Asset Management," G.C. Takur, et al., Pennwell Publishing Co., 1998, pp. 176-178 of Abstract Set 5.
Abstract of "Breaking of a Paradigm: The Simultaneous Production of the Gascap and Oil Column," T.C. Billiter, et al., 6$^{TH}$ SPE Oil & Gas Int Conf in China, Nov. 2-6, 1998, pp. 178-179 of Abstract Set 5.
Abstract of "Integrated Reservoir and Surface Network Simulation in Reservoir Management of Southern North Sea Gas Reservoirs," J. Tingas, et al., SPE Europe Petrol Conf, Oct. 20-22, 1998, pp. 179-181 of Abstract Set 5.
Abstract of "Labs Spin Out Oil Field Technologies," A.J. Mansure, et al., Amer Oil Gas Reporter, V. 41, No. 7, Jul. 1998, pp. 181-183 of Abstract Set 5.
Abstract of "Automated Material Balance System for Hydrocarbon Reservoirs Using a Genetic Procedure," M.D. McCormack, et al., World, Mar. 14, 1997, pp. 185-187 of Abstract Set 5.
Abstract of "Improved Methods for Multivariate Optimization of Field Development Schedulilng and Well Placement Design," Y. Pan, et al., Annu SPE Tech Conf, Sep. 27-30, 1998, pp. 187-189 of Abstract Set 5.
Abstract of "Resolving Reservoir Uncertainty to Create Value," L.G. Chorn, et al., Annu SPE Tech Conf, Sep. 27-30, 1998, pp. 189-191 of Abstract Set 5.
Abstract of "Increasing Heavy Oil Reserves in the Wilmington Oil Field Through Advanced Reservoir Characterization and Thermal Production Technologies: Annual Report (Mar. 30, 1995-Mar. 31, 2996)," US DOE Fossil Energy Rep NO/DOE/BC/14939-8, Sep. 1997, pp. 194-196 of Abstract Set 5.
Abstract of "Reservoir Compaction, Surface Subsidence, and Casing Damage: A Geomechanics Approach to Mitigation and Reservoir Management," J.T. Fredrich, et al., SPE/ISRM Rock Mech in Petrol Eng (EUROCK 98) Conf, Jul. 8-10, 1998, pp. 196-198 of Abstract Set 5.
Abstract of "Reservoir Management for Waterfloods: PT2," R. Baker, J Can Petrol Technol, V. 37, No. 1, Jan. 1998, pp. 198-199 of Abstract Set 5.
Abstract of "Improved Reservoir Management Using Geostatistical Reservoir Description, 24Z Stevens Reservoir, Elk Hills Oil Field, California," J.M.G. Brown, et al., 68$^{TH}$ Annu SPE West Reg Mtg, May 10-13, 1998, pp. 201-203 of Abstract Set 5.
Abstract of "Improving Hydrocarbon Recovery Efficiency Utilising (sic) Horizontal Production and/or Injection Wells," L.P. Dake, et al., 9$^{TH}$ EAGE Impr Oil Recovery Europe Symp, Oct. 20-22, 1997, pp. 203-205 of Abstract Set 5.
Abstract of "Identification and Reduction on Uncertainties in Automatic History Matching and Forecasting," T. Yi, et al., 9$^{TH}$ EAGE Impr Oil Recovery Europe Symp, Oct. 20-22, 1997, pp. 205-207 of Abstract Set 5.
Abstract of "Adaptive Mathematical Model of Oil Reservoir Development," V.D. Lysenko, Neftepromysl DELO Nos. 4-5, Apr.-May 1997, pp. 207-208 of Abstract Set 5.
Abstract of "A Stage of Application Reservoir Management Process on Pantai Pakam Timur High Permeability Gas Field: A Field Case," C. Briantoro, et al., SPE Int Petrol Conf of Mex, Mar. 3-5, 1998, pp. 210-212 of Abstract Set 5.
Halliburton Energy Services, Inc., "Smart Well Technology Asset Management of the Future", Aug. 1998 (6 pages).

Clark E. Robison, "Overcoming the Challenges Associated With the Life-Cycle Management of Multilateral Wells: Assessing Moves Toward the 'Intelligent Completion'", SPE 38497, paper prepared for presentation at the 1997 Offshore Europe Conference, Aberdeen, Scotland, Sep. 9-12, 1997, pp. 269-276 (8 pages).
G. Botto et al., Snyopsis of "Innovative Remote Controlled Completion for Aquila Deepwater Challenge", JPT, Oct. 1997, originally presented at the 1996 SPE European Petroleum Conference, Milan, Italy, Oct. 22-24, 1996 (3 pages).
Sheila Popov, "Two Emerging Technologies Enhance Reservoir Management", Hart's Petroleum Engineer International, Jan. 1998, pp. 43 and 45 (2 pages).
Dick Ghiselin, "New Technology, New Techniques, Set the Pace for Success", Hart's Petroleum Engineer International, Jan. 1998, 2 pages.
Ken R. LeSuer, "Breakthrough Productivity—Our Ultimate Challenge", Offshore, Dec. 1987 (1 page).
Thomas R. Bates, Jr., "Technology Pace Must Accelerate to Counter Oilfield Inflation", Offshore, Dec. 1987 (1 page).
Bjarte Bruheim, "Data Management—A Key to Cost Effective &P", Offshore, Dec. 1987 (1 page).
David M. Clementz, "Enabling Role of Information Technology: Where are the Limits?", Offshore, Dec. 1997, p. 42 (1 page).
George R. Remery, "Reshaping Development Opportunities", and David Harris, Training and Cooperation Critical to Deepwater Furture, Offshore, Dec. 1997, p. 44 (1 page).
Ian C. Phillips, "Reservoir Management of the Future", Halliburton M&S Ltd., Aberdeen, Scotland, paper presented at EU Thermie Conference, Apr. 1997, Aberdeen, Scotland, pp. 1-15.
Safley et al., "Projects Implement Management Plans", The American Oil & Gas Reporter, vol. 41, No. 9, Sep. 1998, XP000957690, pp. 136, 138-142 (6 pages).
Vinje, "Reservoir Control Using Smart Wells", 10$^{th}$ Underwater Technology Conference Proceedings, Mar. 25-26, 1998, XP000957692, 9 pages.
Beamer et al., "From Pore to Pipeline, Field Scale Solutions"; Oilfield Review, vol. 10, No. 2, 1998, XP000961345, pp. 2-19 (18 pages).
Allard et al., "Reservoir Management Making a Difference in Australia's First Oilfield Developed Entirely With Horizontal Wells", paper SPE 50051, SPE Asia Specific Oil & Gas Conf., Oct. 12-14, 1998, pp. 165-173 (9 pages).
Smith et al., "The Road Ahead to Real-Time Oil and Gas Reservoir Management", Trans. Inst. Chem. Eng., vol. 76, No. A5, Jul. 1998, XP000957748, 18 pages.
KBR Enterprise—Client RTO Portal, RTO Portal User Manual, Version 1, Dec. 2002, 91 pages.
Ajayi, et al., "A Dynamic Optimisation Technique for Simulation of Multi-Zone Intelligent Well Systems in a Reservoir Development", SPE 84192 Society of Petroleum Engineers, Copyright 2003, pp. 1-7 (7 pages).
Bruni, et al., "A Technically Rigorous and Fully Automated System for Performance Monitoring and Production Test Validation", SPE 84881, Society of Petroleum Engineers, Copyright 2003, pp. 1-10 (10 pages).
Webpage, Landmark: A Halliburton Company, "Calendar of Innovations 2003", Apr. 2003—Decision Space™—Decision Management System, mhtml:file://C:\Documents%20and%20 Settings\jyg.FRDOMAIN\Local%20Settings\Tempo..., printed Jun. 6, 2004, 2 pages.
Webpage, Landmark: A Halliburton Company, "Calendar of Innovations 2003", May 2003—Decision Space Asset Planner™, mhtml:file://C:\Documents%20and%20Settings\jyg.FRDOMAIN\Local%20Settings\Tempo..., printed Jun. 6, 2004, 2 pages.
Brochure, Landmark: A Halliburton Company, Corporate Data Archiver™, Copyright 2003, 4 pages.
Cullick, et al., "Optimizing Multiple-Field Scheduling and Production Strategy with Reduced Riski", SPE 84239, Society of Petroleum Engineers, Copyright 2003, pp. 1-12 (12 pages).

Litvak, et al., "*Prudhoe Bay E-Field Production Optimization System Based on Integrated Reservoir and Facility Simulation*", SPE 77643, Society of Petroleum Engineers, Copyright 2002, pp. 1-11 (11 pages).

Bogaert, et al., "*Improving Oil Production Using Smart Fields Technology in the SF30 Satellite Oil Development Offshore Malaysia*," OTC 16162, Offshore Technology Conference, Copyright 2004, pp. 1-7 (7 pages).

Rommetveit, Rolv, Vefring, E.H., Wang, Zhihua, Bieseman, Taco, Faure, A.M., "*A Dynamic Model for Underbalanced Drilling With Coiled Tubing*," SPE/IADC 193693, paper prepared for presentation at the 1995 SPE/IADC Drillilng Conference, Amsterdam, Feb. 28-Mar. 2, 1995, 11 pages.

Dirk Neupert, Michael Schlee, Ewald Simon, MODI—an expert system supporting reliable, economical power plant control, Jan. 1994, ABB Review, 9 pages.

B. He and A.K. Kochhar, An expert system for the diagnosis and control of manufacturing processes, Nov. 1988, International Conference on Computer Aided Production Engineering, 7 pages.

Caers, Jef, "*Efficient gradual deformation using a streamline-based proxy method*", Journal of Petroleum Science and Engineering 39 (2003), pp. 57-83 (27 pages).

Yeten, B., Castellini, A., Guyaguler, B., Chen, W.H., "*A Comparison Study on Experimental Design and Response Surface Methodologies*", SPE 93347, prepared for presentation at the 2005 SPE Reservoir Simulation Symposium in Houston, Texas, Jan. 31-Feb. 2, 2005, 15 pages.

Guyaguler, Bads, Horne, Roland N., Rogers, Leah, Rosenzweig, Jacob J., "*Optimization of Well Placement in a Gulf of Mexico Waterflooding Project*", SPE 63221, pp. 667-676, prepared for presentation at the 2000 SPE Annual Technical Conference and Exhibition, Dallas, Texas, Oct. 1-4, 2000, 12 pages.

Aminian, K., Ameri, S., "*Application of artificial neural networks for reservoir characterization with limited data*", Journal of Petroleum Science and Engineering 49, pp. 212-222, May 20, 2005, 11 pages.

Oberwinkler, Christian, Stundner, Michael, "*From Real Time Data to Production Optimization*", SPE 87008, prepared for presentation at the SPE Asia Pacific Conference on Integrated Modelling for Asset Management, Kuala Lumpur, Malaysia, Mar. 29-30, 2004, 14 pages.

Oberwinkler, Christian, Ruthammer, Gerhard, Zangl, Georg, Economides, Michael , "*New Tools for Fracture Design Optimization*", SPE 86467, prepared for presentation at the SPE International Symposium and Exhibition on Formation Damage Control, Lafayette, Louisiana, Feb. 18-20, 2004, 13 pages.

Johnson, Virginia M., Ammer, James R., Trick, Mona D., "*Improving Gas Storage Development Planning Through Simulation-Optimization*", SPE 65639, prepared for presentation at the 2000 SPE Eastern Regional Meeting, Morgantown, West Virginia, Oct. 17-19, 2000, 18 pages.

Du, Yuqi, Weiss, W.W., Xu, Jianyun, Balch, R.S., Li, Dacun, "*Obtain an Optimum Artificial Neural Network Model for Reservoir Studies*", SPE 84445, prepared for presentation at the SPE Annual Technical Conference and Exhibition, Denver, Colorado, Oct. 5-8, 2003, 8 pages.

Sengul, Mahmut, Bekkousha, Miloud A., "*Applied Production Optimization: i-Field*", SPE 77608, prepared for presentation at the SPE Annual Technical Conference and Exhibition, San Antonio, Texas, Sep. 29-Oct. 2, 2002, 12 pages.

Stundner, M., Al-Thuwaini, J.S., "*How Data-Driven Modeling Methods like Neural Networks can help to integrate different Types of Data into Reservoir Management*", SPE 68163, prepared for presentation at the 2001 SPE Middle East Oil Show, Bahrain, Mar. 17-20, 2001, 8 pages.

Yeten, Burak, Durlofsky, Louis J., Aziz, Khalid, "*Optimization of Nonconventional Well Type, Location, and Trajectory*", SPE 86880, SPE Journal, Sep. 2003, pp. 200-210 (11 pages).

He, Xin-Gui, Xu, Shao-Hua, "*Process Neural Network with Time-Varied Input and Output Functions and its Applications*," Ruan Jian Xue Bao/Journal of Software, v. 14, n. 4, Apr. 2003. p. 764-769 (6 pages).

Dashevskiy, D., Dubinsky, V., Macpherson, J.D., "*Application of Neural Networks for Predictive Control in Drilling Dynamics*", SPE 56442, prepared for presentation at the 1999 SPE Annual Technical Conference and Exhibition, Houston, Texas, Oct. 3-6, 1999, 10 pages.

Centilmen, A., Ertekin, T., Grader, a.S., "*Applications of Neural Networks in Multiwell Field Development*", SPE 56433, prepared for presentation at the 1999 SPE Annual Technical Conference and Exhibition, Houston, Texas, Oct. 3-6, 1999, 13 pages.

Sung, Andrew H., "*Applications of soft computing in petroleum engineering*", SPIE vol. 3812, Part of the SPIE Conference on Applications and Science of Neural Networks, Fuzzy Systems, and Evolutionary Computation II, Denver, Colorado, Jul. 1999, 13 pages.

Mohaghegh, Shahab D., "*Recent Developments in Application of Artificial Intelligence in Petroleum Engineering*", Journal of Petroleum Technology, v. 57, n. 4, Apr. 2005, pp. 86-91 (6 pages).

U.S. Appl. No. 11/625,197, Inventors Richard G. Ella, Andrew Russell, Laurence Reid, and William D. Johnson, "Dynamic Production System Management", filed Jan. 19, 2007 (70 pages).

Notification of Transmittal of the International Search Report or the Declaration (2 pages), International Search Report (3 pages) and Written Opinion of the International Searching Authority (5 pages) for International Application No. PCT/US07/01327 mailed Jul. 30, 2008.

Notification Concerning Transmittal of International Preliminary Report on Patentability (1 page), International Preliminary Report on Patentability (1 page), and Written Opinion of the International Searching Authority (3 pages) for International Application No. PCT/US2007/001327 mailed Aug. 28, 2008.

United States Patent and Trademark Office, Office Action, May 19, 2008, pp. 1-21.

United States Patent and Trademark Office, Office Action, Oct. 2, 2008 (14 pages).

J.P. Lecher, et al., "Treating Uncertainties in Reservoir Performance Prediction With Neural Networks", SPE 94357, XP-002438774, Society of Petroleum Engineers, Copyright 2005, 8 pages.

T.E.H. 'Esmaiel, et al., "Determination of WAG Ratios and Slug Sizes Under Uncertainty in a Smart Wells Environment," SPE 93569, XP-002438797, Society of Petroleum Engineers, Inc., Copyright 2005, 9 pages.

Sanjay Srinivasan, et al., "Conditioning reservoir models to dynamic data—A forward modeling perspective," SPE 62941, Society of Petroleum Engineers, Copyright 2000, 16 pages.

Mahmut Sengul, et al., "Applied Production Optimization: i-Field." SPE 77608, Society of Petroleum Engineers, Copyright 2002, 12 pages.

Saputelli L., et al., "A Critical Overview of Artificial Neural Network Applications in the Context of Continuous Oil Field Optimization," SPE 77703, Society of Petroleum Engineers, Copyright 2002, 10 pages.

Burak Yeten, et al., "Optimization of Smart Well Control," SPE/Petroleum Society of CIM/CHOA 79031, SPE/PS-CIM/CHOA International Termal Operations and Heavy Oil Symposium and International Horizontal Well Technology Conference, Copyright 2002, 10 pages.

L.A. Saputelli, et al., "Promoting Real-Time Optimization of Hydrocarbon Producing Systems," SPE 83978, Society of Petroleum Engineers, Copyright 2003, 9 pages.

Jorge L. Landa, et al., "A Methodology for History Matching and the Assessment of Uncertainties Associated with Flow Prediction," SPE 84465, XP-002438840, Society of Petroleum Engineers, Copyright 2003, 14 pages.

Christian Oberwinkler, et al., "From Real Time Data to Production Optimization," SPE 87008, Society of Petroleum Engineers, Copyright 2004, 14 pages.

B. Yeten, et al., "A Comparison Study on Experimental Design and Response Surface Methodologies," SPE 93347, Society of Petroleum Engineers, 15 pages, copyright 2005.

J.R.P. Rodrigues, "Calculating Derivatives for History Matching in Reservoir Simulators," SPE 93445, XP-002144471, Society of Petroleum Engineers, Copyright 2005, 9 pages.

T.E.H. Esmaiel, et al., "Reservoir Screening and Sensitivity Analysis of Waterflooding With SmartWells Through the Application of Experimental Design," SPE 93568, XP-002438798, Society of Petroleum Engineers, Copyright 2005, 8 pages.

A.S. Cullick, et al., "Improved and More-Rapid History Matching With a Nonlinear Proxy and Global Optimization," SPE 101933, Society of Petroleum Engineers, Copyright 2006, 13 pages.

J.L. Landa et al., "History Match and Associated Forecast Uncertainty Analysis—Practical Approaches Using Cluster Computing," IPTC 10751, XP-002444470, International Pretroleum Technology Conference, Copyright 2005, 10 pages.

James Glimm, et al., "Risk management for petroleum reservoir production: A simulation-based study of prediction," Computational Geosciences 5: 173-197, Copyright 2001, 25 pages.

Stephen Chenney, et al., "Proxy Simulations For Efficient Dynamics," The Eurographics Association, Copyright 2001, 10 pages.

Lindsay Birt, et al., "ECLIPSE FloGrid, Application of the ECLIPSE FloGrid fault property calculator to a simple injector-producer pair," Schlumberger Information Solutions, Copyright 2003, 6 pages.

H. Klie, et al., "Models, methods and middleware for grid-enabled multiphysics oil reservoir management," Engineering with Computers, Springer-Verlag London Limited, Copyright 2006, 22 pages.

G. Zangl, et al., "Proxy Modeling in Production Optimization," SPE 100131, Society of Petroleum Engineers, Copyright 2008, 7 pages.

Abstract of "Schedule optimization to complement assisted history matching and prediction under undertainty," H.A. Jutila, Society of Petroleum Engineers, 68$^{th}$ European Association of Geoscientists and Engineers Conference and Exhibition, publication date Dec. 1, 2006, 2 pages.

Abstract of "A rigorous well model to optimize production from intelligent wells and establish the back-allocation Algorithm," T. Graf, Society of Petroleum Engineers, 68$^{th}$ European Association of Geoscientists and Engineers Conference and Exhibition, publication date Dec. 1, 2006, 2 pages.

Abstract of "Improved and more-rapid history matching with a nonlinear proxy and global optimization," A.S. Cullick, SPE Annual Technical Conference and Exhibition, publication date Nov. 23, 2006, 2 pages.

Abstract of "Optimization of the WAG process under uncertainty in a smart wells environment: Utility theory approach," T.E.H. Esmaiel, 2006 SPE Intelligent Energy Conference and Exhibition, publication date Jul. 7, 2006, 2 pages.

Abstract of "A Petrophysics and Reservoir Performance-Based Reservoir Characterization of Womack Hill," J.C. Urbaneja, MS Thesis, Texas A&M University, 2002, pp. 3-5 of Abstract Set 5.

Abstract of "Prudhoe Bay E-Field Production Optimization System Based on Integrated Reservoir and Facility Simulation," M.L. Litvak, et al., Annu SPE Tech Conf, Sep. 29-Oct. 2, 2002, pages 16-18 of Abstract Set 5.

Abstract of "Valuation of Technology and Information for Reservoir Risk Management," B. Raghuraman, et al., Annu SPE Tech Conf, Sep. 29-Oct. 2, 2002, pp. 26-28 of Abstract, Set 5.

Abstract of "Reservoir Production Method," T.C. Billiter, et al., US 6,321,840 B1, Aug. 26. 1988, 58-60 of Abstract Set 5.

Abstract of "How to Determine the Best Exploitation Strategy from a Reservoir," W. Acosta, et al., 7$^{TH}$ SPE Latin Amer & Caribbean Petrol Eng Conf, Mar. 25-28, 2001, pp. 73-75 of Abstract Set 5.

Abstract of "Reservoir Management Strategies for Development of Gas Dissolved in Water (Brine) Reservoirs." J.F. Manrique, et al., SPE Asia Pacific Conf, Apr. 25-26, 2000, pp. 123-125 of Abstract Set 5.

Abstract of "The Hibernia Oil Field: Integration of Geophysical, Geological, and Production Data into Reservoir Characterization and Monitoring," L.J. Sydora, 31$^{ST}$ Annu SPE et al Offshore Technol Conf, May 3-6, 1999, pp. 145-147 of Abstract Set 5.

Abstract of "Use of Multi-Laterial Wells to Acces Marginal Reservoirs," J. Winton, Offshore Int. V. 59, No. 2, Feb. 1999, pp. 174-176 of Abstract Set 5.

Abstract of "UBIT Field Rejuvenation: A Case History of Reservoir Management of a Giant Oil Field, Offshore Nigeria," C.A. Clayton, et al., Annu SPE Tech Conf, Sep. 27-30, 1998, pp. 192-194 of Abstract Set 5.

Abstract of "A Reservoir Management Model for 26R Reservoir. Elk Hills Oil Field, California." D.P. Echols, et al.. 68$^{TH}$ Annu SPE West Reg Mtg, May 10-13, 1998, pp. 200-201 of Abstract Set 5.

Abstract of "Reservoir Management in the B-6/9, SVS-82. Lake Maracaibo, Venezuela—New Exploitation Policy for Maximizing Profit," G. De Carvajal, et al., 5$^{TH}$ SPE Latin Amer & Caribbean Petrol Eng Conf, Aug. 30-Sep. 3, 1997, pp. 208-210 of Abstract Set 5.

United States Patent and Trademark Office, Office Action, U.S. Appl. No. 11/625,197; Sep. 4, 2009 (23 pages).

Kosmala, Alexandre, et al., *Coupling of a Surface Network With Reservoir Simulation*, SPE 84220, Society of Petroleum Engineers, Copyright 2003 (11 pages).

File Wrapper History for US Patent Application No. 12/121,710, 1152 pages.

Office Action for CN Application No. 2007800025651.1 mailed Nov. 22, 2010 and English translation, 35 pages.

File Wrapper History for U.S. Appl. No. 11/625,197, 1266 pages.

Search Report in corresponding European patent application No. 07716765.8, 7 pages.

United States Patent and Trademark Office, Office Action, U.S. Appl. No. 11/625,197; Apr. 14, 2010 (22 Pages).

United States Patent and Trademark Office, Office Action, U.S. Appl. No. 11/625,197; Sep. 24, 2010 (22 pages).

Chinese Office Action mailed Apr. 28, 2011 in CN application No. 200780002565.1 (44 pages).

Coats et al., "A Generalized Wellbore and Surface Facility Model, Fully Coupled to a Reservoir Simulator", Apr. 2004, SPE Reservoir Evaluation & Engineering, pp. 132-142.

* cited by examiner

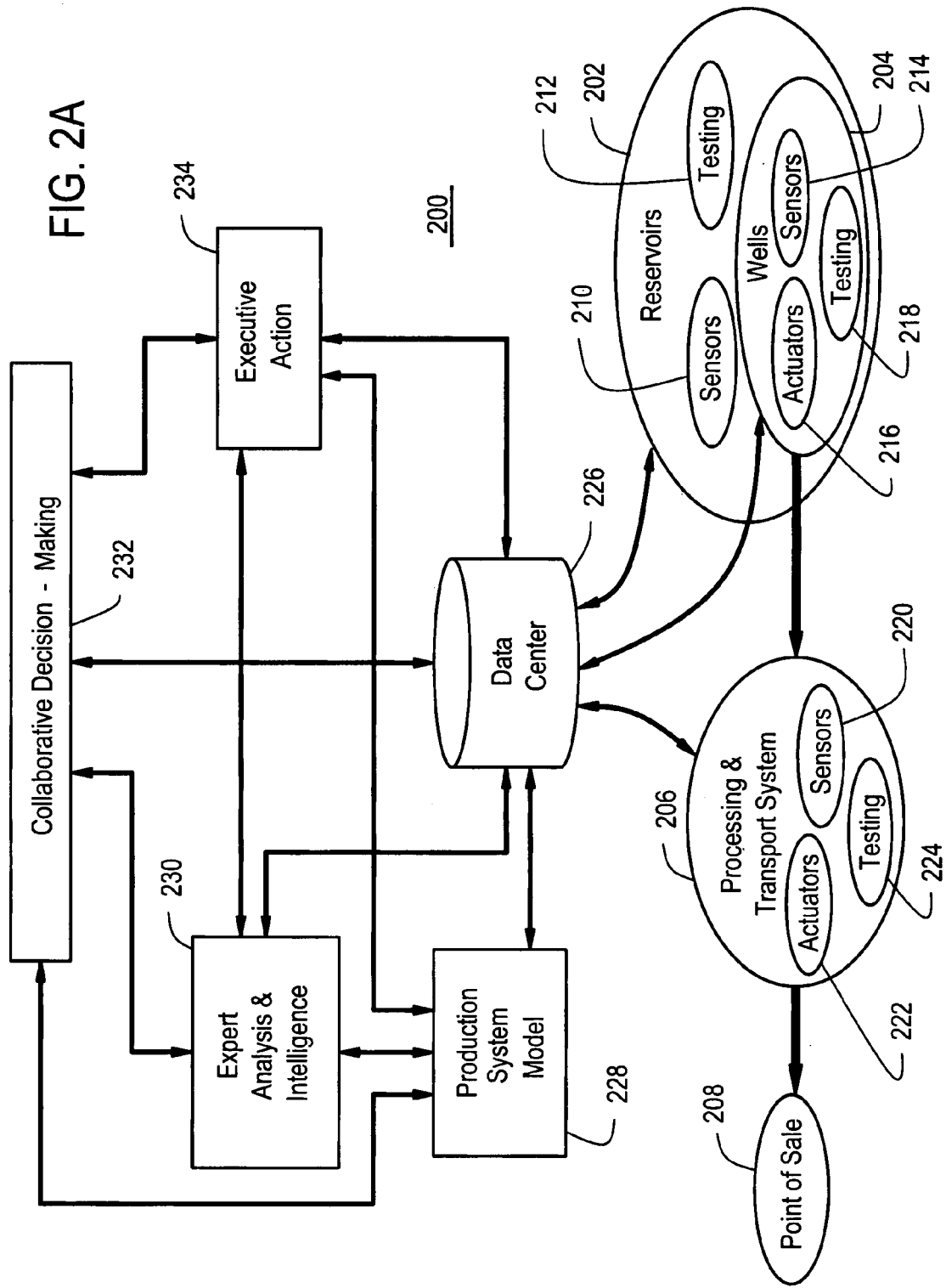

DYNAMIC PRODUCTION SYSTEM MANAGEMENT

This application claims the benefit of U.S. Provisional Application No. 60/760,708, filed Jan. 20, 2006.

BACKGROUND

This description relates to management of production of subterranean reservoirs.

Traditionally, subterranean reservoirs and the systems for recovering, processing and transporting the resources recovered from the reservoirs to a point of sale have been under realized, because of inefficiencies in management stemming from fragmentation, in time and communication, of current and historic data about the reservoirs and systems, expert interpretation, decision-making and executive actions. The fragmentation in time and communication results not only in losses, but failure to achieve enhancement opportunities. Furthermore, although some production subsystems may be regularly monitored for opportunities to mitigate loss or enhance their operation, the fragmentation commonly experienced prevents accounting for the impacts of discovered or experienced losses or the initiation of actions taken to mitigate the loss or realize the enhancement on the overall production system. Optimization studies consistently demonstrate that significant and subsequent optimization of production and operational efficiencies are achievable and indicate an inherent inability of those systems to sustain effective operation of the upstream production system.

SUMMARY

The present disclosure describes, generally, illustrative systems and methods for managing production of subterranean reservoirs, including upstream production systems.

One aspect encompasses a method where data about operation of a well for extracting a product from the subterranean reservoir and at least one of a characteristic of a subterranean reservoir or operation of a processing and transport system upstream of a point of sale is received. A corrective action is initiated on at least one of the well or the processing and transport system in response to a difference between the received data and a specified operational objective. In certain instances, an article comprising a machine-readable medium stores instructions operable to cause one or more machines to perform the operations including the method. In certain instances, a system having at least one processor and at least one memory coupled to the at least one processor stores instructions operable to cause the at least one processor to perform operations including the method.

Another aspect encompasses a method where data about operation of a well for extracting a product from a subterranean reservoir and at least one of a characteristic of the subterranean reservoir or operation of a processing and transport system upstream of a point of sale prior to a refinery is received. Using the data and a model of the well, the subterranean reservoir and the processing and transport system, a corrective action to at least one of the well or the processing and transport system in relation to a specified operational objective is automatically determined. A corrective action to at least one of the well, a gathering system of the processing and transport system or a production facility of the processing and transport system. In certain instances, an article comprising a machine-readable medium stores instructions operable to cause one or more machines to perform the operations including the method. In certain instances, a system having at least one processor and at least one memory coupled to the at least on processor stores instructions operable to cause the at least one processor to perform operations including the method.

Another aspect encompasses a method where data about operation of a well for extracting a product from the subterranean reservoir and at least one of a characteristic of a subterranean reservoir or operation of a processing and transport system upstream of a point of sale is received. An adjustment to a model of the reservoir, the well, and the processing and transporting system is automatically initiated in response to the received data. In certain instances, an article comprising a machine-readable medium stores instructions operable to cause one or more machines to perform the operations including the method. In certain instances, a system having at least one processor and at least one memory coupled to the at least one processor stores instructions operable to cause the at least one processor to perform operations including the method.

Certain aspects include one or more of the following features. The operational objective includes at least one of product sales rate or a product production rate. The processing and transport system includes a production facility for processing the product upstream of a refinery or gathering system for transporting the product from the well to the point of sale. Automatically initiating a corrective action on the production facility includes at least one of initiating an adjustment to an amount of a flow supplied to a separator, an adjustment to the pressure of a flow supplied to the separator, an adjustment to a flow rate of a flow supplied to a separator, an adjustment to an amount of a flow supplied to a dehydrator, an adjustment to the pressure of a flow supplied to the dehydrator, an adjustment to a flow rate of a flow supplied to a dehydrator, an adjustment to a valve, an adjustment to a choke, an adjustment to a flow control device, an adjustment to a compressor, an adjustment to a pump, an adjustment to a heater, an adjustment to a cooler, or an adjustment to a fluid level. Automatically initiating a corrective action on the gathering system includes at least one of initiating an adjustment to an amount of a flow through a pipe, an adjustment to a pressure of a flow supplied through a pipe, an adjustment to a flow rate of a flow supplied through a pipe, an adjustment to a valve, an adjustment to a choke, an adjustment to a flow control device, an adjustment to a compressor, an adjustment to a pump, an adjustment to a heater, and an adjustment to a cooler. Automatically initiating a corrective action on the well includes initiating an adjustment to at least one of a production rate from the well or an injection rate to the well. Automatically determining the corrective action is performed using a model of the subterranean reservoir, the well and the processing and transport system. The model comprises at least one of a first principal model, a proxy model, or a derived model. An adjustment to the model is automatically initiated in response to the received data. The data about a characteristic of the subterranean reservoir includes at least one of seismic data, geologic data or log data. The data about operation of the well includes at least one of flow rate, pressure, temperature, fluid composition, fluid density, viscosity or actuator state. The data about operation of the processing and transport system includes at least one of flow rate, pressure, temperature, fluid composition, fluid density, viscosity or actuator state. Receiving data includes receiving the data in real time. Automatically initiating a corrective action includes automatically initiating a corrective action in real time. Operations can include automatically initiating a corrective action on at least one of the well or the processing and transport system, the corrective action determined using the adjusted model. Adjusting the model comprises adjusting the model in real time.

The details of one or more implementations are set forth in the accompanying drawings and the description below. Other features, objects, and advantages will be apparent from the description and drawings, and from the claims.

DESCRIPTION OF DRAWINGS

FIG. 2A is a block diagram of an illustrative production management system operating on an upstream production system.

Like reference symbols in the various drawings indicate similar or like elements.

DETAILED DESCRIPTION

The present disclosure describes managing an upstream production system, including some illustrative examples of systems and methods therefore. As used herein, an upstream production system encompasses one or more subterranean reservoirs having one or more hydrocarbon producing formations therein, the wells used in extracting the hydrocarbons and other fluids (the "product") and by-products from the reservoirs, and the processing and transport system for processing and moving the product from the reservoirs to a point of sale. The point of sale need not be marked by a conventional sale for consideration, but can encompass other transfers, including intra-company transfers of control. The upstream production system may include reservoirs that span across multiple leases, concessions or other legal, governmental or physical boundaries, and can encompass reservoirs, wells, and processing and transport systems owned, controlled or operated by one or more than one company or legal entity. The wells for extracting the product and the processing and transport system for processing and moving the product can include one or more of offshore or onshore installations. In certain instances, the product comprises crude oil, natural gas and/or liquefied natural gas.

Figure 1:
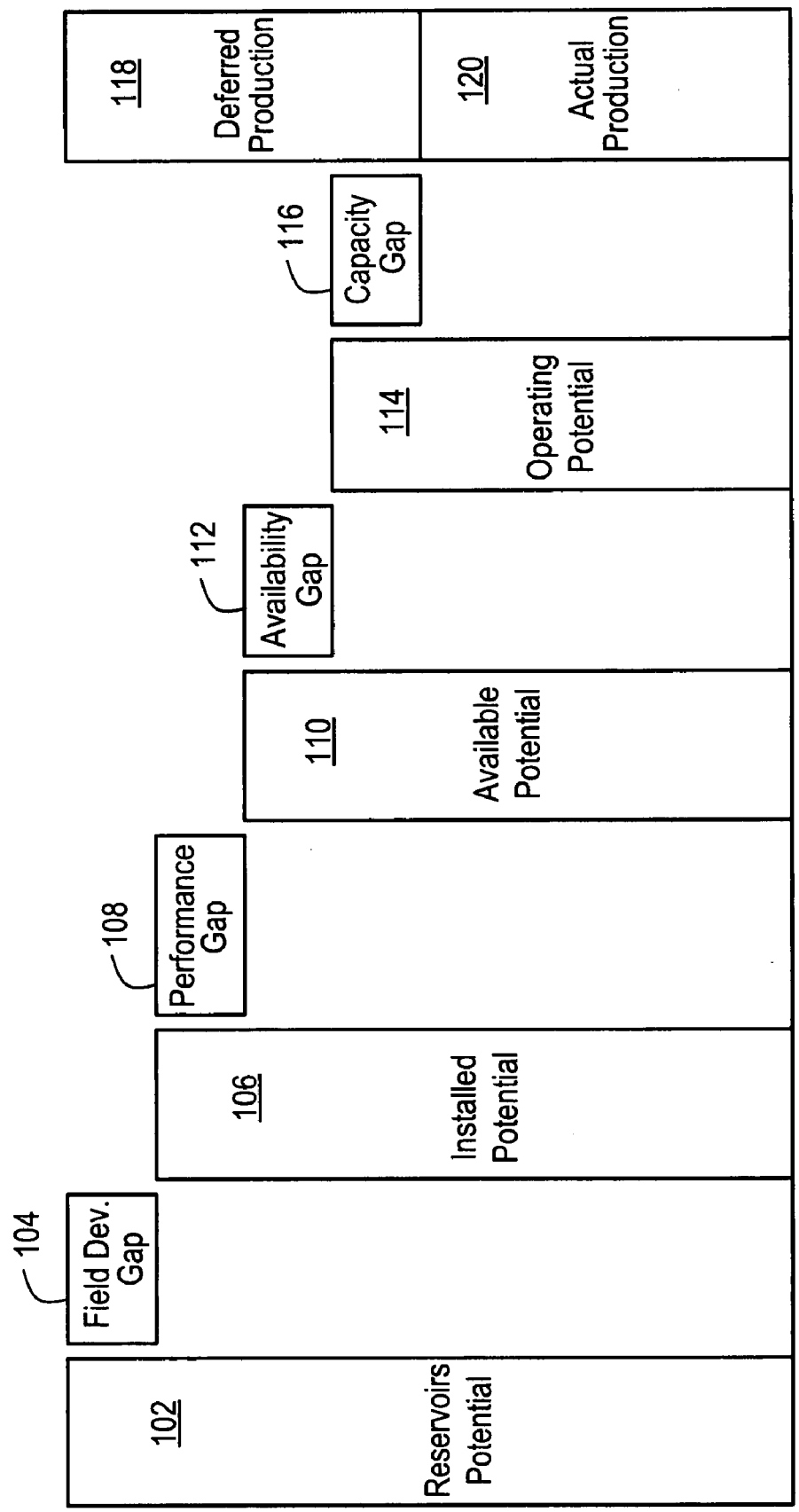
FIG. 1 is a bar chart that graphically represents a hierarchy of production deferments typically experienced between a potential production attainable from subterranean reservoirs and the actual production attained from the reservoirs as potentials and deferment gaps.

Referring first to FIG. 1, the subterranean reservoirs of the upstream production system contain a finite amount of products. For a variety of reasons, however, not all of the products can or will be produced from the subterranean reservoirs. Stated differently, a portion of the potential production of products is deferred. The bar chart in FIG. 1 graphically represents the hierarchy of the production deferments as potentials and deferment gaps. The finite amount of reachable products contained within the subterranean reservoirs define the reservoir potential 102 (i.e. the upstream production systems potential production and ultimate level of recovery achievable). Some example classes of deferments of production are discussed below.

One deferment of production, a field development gap 104, derives from the installation of wells and other infrastructure to the subterranean reservoirs that may not be capable of producing all of the finite amount of reachable products in the subterranean reservoirs. For example, in designing the installation of wells and infrastructure, one may balance the cost against the value of the production that is expected to be obtained from the subterranean reservoirs. In many instances, it may not be financially feasible to install the wells and infrastructure necessary to extract all of the reachable products. Further, additional factors, such as economic factors, political factors, availability of equipment and materials, availability of personnel and other factors, may contribute to an implementation that is not capable of extracting all of the reachable products. Additionally, a specified design may be less than fully implemented during some portions of the operations. For example, it is likely infeasible to complete all of the wells and infrastructure that will be used in extracting products from the reservoirs at the same point in time. The design may also dictate a staged installation of the wells and infrastructure, as well as a staged plan for producing the formations of the reservoirs. Therefore, when the reservoirs are less than fully developed and/or configured to produce from less than all of the formations, even less of the reachable products can be extracted. The capability of the wells and infrastructure to extract reachable products results in an installed potential 106. Accordingly, the field development gap 104 develops as a function of the difference between the upstream production system potential 102 and the installed potential 106.

Another deferment of production, a performance gap 108, derives from the degradation of operating performance of the one or more subterranean reservoirs, the wells, and the processing and transport system. For example, over the life of a reservoir, the amount and the rate at which the products can be extracted changes, and typically decreases as reservoir conditions make extraction of products more difficult. Furthermore the product composition may change over the life of the reservoir. The amount of reachable and or viable products in the reservoir decreases, and easily reachable, viable products are depleted forcing production to turn to products that are more difficult to reach. Likewise, over the life of a well, its efficiency at extracting the products decreases as the conditions at the well bore change and the equipment and other hardware of the well lose performance (e.g. by wear, clogging, failure or other). These reservoir and well characteristics are the cause of uncertainty inherent in upstream production operations that, in certain instances, are desirable to mitigate or respond to. Over the life of the processing and transport system, the efficiency in processing and moving products decreases as the equipment and other hardware of the system lose performance (e.g. by wear, clogging, failure or other). The diminished or degraded operating performance of the upstream production system results in an available potential 110. Accordingly, the performance gap 108 develops as a function of the difference between the installed potential 106 and the available potential 110.

Another deferment of production, an availability gap 112, derives from the lack of availability of equipment, materials, and personnel necessary to achieve and maintain the available potential 110. For example, as the performance of equipment and/or the wells and infrastructure degrades, it may reduce the operational efficiency of the wells and infrastructure or facilities. To recapture the loss in efficiency, the equipment may need adjustment, service or replacement, or the well may need to be worked over or decommissioned and re-drilled at another location. If the equipment, materials or personnel necessary for the adjustment, service or replacement are unavailable, the reduced efficiency will continue until such equipment, materials or personnel are available. Likewise, in a staged development plan, the rate at which the reservoir is further developed may be limited by the availability of equipment, materials, and personnel. At any one time, there may be multiple instances where the limited or unavailability of equipment, materials or personnel prevents attaining the available potential 110. The availability of equipment, materials and personnel results in an operating potential 114. Accordingly, the availability gap 112 develops as a function of the difference between the available potential 110 and the operating potential 114.

Another deferment of production, a capacity gap 116, derives from the failure of the upstream production system, including the wells, processing and transport system, and components and equipment thereof to be optimally set up or adjusted to achieve the operating potential 114. For example, as operational conditions change, the wells, processing and transport system, and/or components and equipment thereof may need to be adjusted to optimally or near optimally compensate for the changes in the conditions. Additionally, the actual operation of the wells, processing and transport system, and/or components equipment thereof may differ from the intended operation, such as, because of loss of efficiency (e.g. by wear, clogging, failure or other) or because the expected operation of the reservoirs, the wells, and/or the processing and transport system does not accurately represent the actual operation (e.g. because it was not initially modeled accurately or maintained precisely therefore or the assumptions incorporated into or derived from the model are outdated or otherwise incorrect). To achieve the intended operation, the wells and infrastructure, facilities, and/or equipment thereof may need adjustment. The deferment and production attributable to the components and subcomponents of the upstream production system not being optimally set up or adjusted result in an actual production 120. Accordingly, the capacity gap 116 develops as a function of the difference between the operating potential 114 any actual production 120.

The sum of the field development gap 104, performance gap 108, availability gap 112, and capacity gap 116 accounts for a total deferred or in certain instances lost production 118 between the actual production 120 and the upstream production system potential 102. The illustrative systems and methods described herein operate, and in some instances automatically operate, to reduce the performance gap 108, availability gap 112 and capacity gap 116 and increase, and in some instances optimize, the available potential 110, the operating potential 114, and actual production 122 and reduce the total deferred production 118.

Figure 2B:
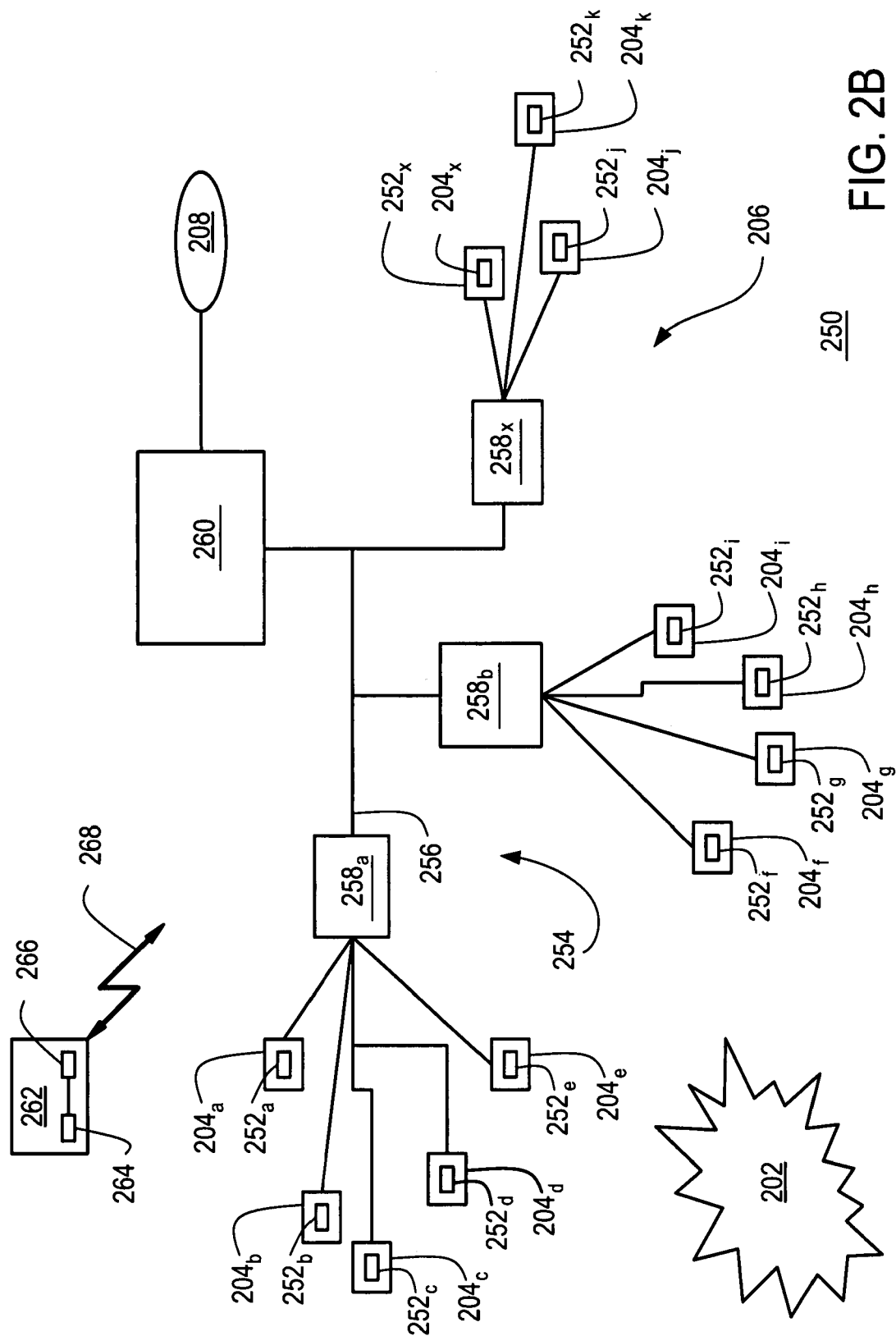
FIG. 2B is a schematic diagram of an illustrative upstream production system operated by the illustrative management system of FIG. 2A

Turning now to FIG. 2A, an illustrative production management system 200 is depicted in block diagram format. The illustrative system 200 operates on an upstream production system, such as the illustrative upstream production system 250 schematically depicted in FIG. 2B, to control the upstream production system toward or to achieve one or more operational objectives. The illustrative production management system 200 controls the upstream production system, in certain instances, by implementing one or more corrective actions to work toward or achieve the one or more operational objectives. The operation of the illustrative production management system 200, and resulting control of the upstream production system 250, can be entirely automated or can be partially automated. As will become apparent from the discussions below, in certain instances, the illustrative production management system 200 can operate to analyze and initiate and/or execute corrective actions to the upstream production system 250 and its operation continuously or substantially continuously, periodically at regular and/or irregular intervals, or sometimes continuously and sometimes periodically. Different aspects of the illustrative production management system 200 can operate at different rates. In certain instances, some or all of the corrective actions can be initiated and/or executed without substantial delay from relevant operationally significant changes in the upstream production system 250. In certain instances, some or all of the corrective actions can be initiated and/or executed in real time, temporally proximate to relevant operationally significant changes in the upstream production system 250.

In certain instances the operational objectives can include one or more of a specified upstream production system value objective, a specified production volume, a specified production characteristic, a specified system utilization, a specified operational uptime/availability, a specified maintenance efficiency, a specified environmental emissions, legislative compliance objective or other objectives. The specified upstream production system value objective can include one or more of a specified net present value, specified cash flow, a specified production cost deferment, a specified lifting cost, a specified ultimate recovery factor, a specified ultimate recovered product or other objectives. The production characteristic can include one or more of a heating value, specific gravity, sulfur content, water content or other characteristic. The legislative compliance objective can include one or more of a specified safety objective, a specified emissions, a specified waste disposal objective, a specified by-product recovery, a specified power generation, a specified product allocation or accounting, or other objectives. In certain instances, it can be specified to optimize or nearly optimize and/or maximize or nearly maximize one or more of the objectives. For example, in certain instances, the operational objectives can include maximizing or nearly maximizing production volume from the upstream production system. In certain instances, the operational objectives can be ordered in a hierarchy of importance, and important operational objectives can be weighted more in determining corrective actions while less important operational objectives can be weighted less.

The illustrative upstream production system 250 of FIG. 2B includes one or more reservoirs 202 (one shown), one or more wells and other infrastructure $204_a$-$204_x$ (collectively, wells 204) for extracting products and by-products from the reservoirs 202, and a processing and transport system 206 for processing and transporting the products (and other fluids) between the reservoirs 202 and one or more points of sale 208 (one shown).

The wells 204 include components and equipment $252_a$-$252_x$ thereof (collectively, components 252) to control the production and/or injection from and to the wells. In certain instances, the components 252 include one or more chokes, valves, other flow control devices, sensors, testing devices, surface and/or downhole steam generators, methanol injection systems, compressors, pumps and other equipment. In certain instances, the wells 204 can be completed, or may be in the process of drilling, and may include wells that are producing while they are being drilled.

The processing and transport system 206 includes a gathering and transportation network 254 having a network of pipelines 256 and other equipment and components $258_a$-$258_x$ (collectively equipment 258) that operates in communicating the product and other fluids between the reservoirs 202, one or more production facilities 260 and the point of sale 208. In certain instances, the gathering and transport network 254 can operate to perform one or more of transport products or by-products back to the wells 204 and/or reservoirs 202 for re-injection, provide gas for gas lifting products from the reservoirs 202, compress products and/or by-products, pump products and/or by-products, store products and/or by-products, perform some processing of the products and/or by-products, or other functions. In certain instances, the gathering and transport network equipment 258 can include one or more of valves, chokes, other flow control devices, sensors, testing devices, compressors, pumps, motors, heat exchangers including heaters and/or coolers, separators, storage tanks and other equipment. The production facility 260 operates in separating and treating one or more products and by-products recovered from the wells 204. In certain instances, the production facilities 260 can operate to perform one or more of separate products from by-products (e.g. hydrocarbons from water and sediment), separate products (e.g. gaseous from liquid), treat products and/or by-products (e.g. sweeten, dehydrate, add hydrate inhibitors to, and/or remove heavy metals from products), compress products and/or by-products, pump products and/or by-products, store products and/or by-products, generate power, provide for testing and measurement of the products and/or by-products, or other functions. In certain instances, the production facility 260 includes one or more valves, chokes, other flow control devices, sensors, testing devices, compressors, pumps, turbines, motors, heat exchangers including heaters and/or coolers, separators, dehydrators, emulsifiers, methanol injection systems, storage tanks and other equipment.

With respect to the production management system 200, one or more of the system's aspects can be implemented in digital electronic circuitry, integrated circuitry, or in computer hardware, firmware, software, or in combinations thereof. One or more of the aspects of the production management system 200 can be implemented in a software product (e.g., a computer program product) tangibly embodied in a machine-readable storage device for execution by a programmable processor, and processing operations can be performed by a programmable processor executing a program of instructions to perform the described functions by operating on input data and generating output. One or more of the aspects can be implemented in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language.

One or more aspects of the illustrative production management system 200 can reside on site with the upstream production system 250 or remote from the upstream production system 250. In one example, an operations facility 262 houses one or more processors 264 and one or more machine-readable storage devices 266 used in operating one or more aspects of the production management system 200. In certain instances, the operations facility 262 resides remote from the upstream production system 200 and communicates with actuators, sensors and/or testing (described below) of the reservoirs 202, wells 204 and/or processing and transport system 206 via a wired and/or wireless communications network 268, including one or more publicly accessible communications networks (e.g. the Internet, the telephone network, or other) and/or one or more private communications networks. In certain instances, the operations facility 262 may reside many miles from the upstream production facility 250, and may reside in a different city, country or global region than the upstream production facility 250.

Referring again to FIG. 2A, the production management system 200 may, in certain instances, encompass one or more surface or downhole sensors 210 operable to sense characteristics of the reservoirs 202. The system 200 may also encompass surface based and downhole testing 212 of the reservoirs 202. In certain instances, the one or more sensors 210 can include seismic sensors (e.g. hydrophones and geophones) configured to collect seismic data (including 1D, 2D, 3D, and/or 4D seismic data) and/or other sensors. In certain instances, the testing 212 encompasses testing to determine geologic data, for example, one or more of log data (acoustic, gamma, neutron, electric, or other type of log), core data, spectral density log data. The testing 212 can also encompass testing to determine seismic data and other data. The one or more of the sensors 210 may operate to sense continuously or substantially continuously, periodically at regular and/or irregular intervals, or sometimes continuously and sometimes periodically. The rate at which a sensor 210 samples can depend on the nature of the characteristic that the sensor is sensing, including how quickly the characteristic changes or how changes in the characteristic affect production. In certain instances one or more of the sensors samples often enough to capture operationally significant changes in the parameter being measured. Further, different of the sensors 210 can operate at different sampling rates. In certain instances, one or more of the sensors 210 may be operated to send data in real time and to provide real time data. Real time data, as used herein, is data that is temporally proximate to an operationally significant change in the data being collected (e.g., a parameter being measured, be it measured continuously or periodically in regular and/or irregular intervals). In certain instances, the real time data may be marked with or associated with information regarding the time and source of collection, for example to facilitate use of the data when not used in real time. Real time data is not necessarily continuous data, but in certain instances, continuous data can provide real time data. Also, the testing 212 may be performed continuously or substantially continuously, periodically at regular and/or irregular intervals, or sometimes continuously and sometimes periodically and may depend on the type of testing. In certain instances, the testing 212 may be performed often enough to capture operationally significant changes in the parameter being tested. In certain instances, some or all of the testing 212 may be performed to provide real time data.

The system 200 encompasses one or more surface or downhole sensors 214 operable to sense characteristics of the wells 204 and one or more surface or downhole actuators and/or other regulatory controls (collectively actuators 216) operable to control operation of the wells 204 and the components 252 thereof. The system 200 also encompasses surface based and downhole testing 218 of the wells 204. In certain instances, the sensors 214 sense information about production and/or injection, for example, one or more of pressure, temperature, viscosity, flow rate, compositional profiles, operational states of components of the wells 204, and other characteristics. In certain instances, the testing 218 encompasses testing to determine the condition and operation of the wells 204. In certain instances, the sensors 214 and/or the testing 218 determine one or more of production flow rate, injection flow rate, injection pressure, production pressure, annulus pressure, formation pressure, bottom hole pressure, wellhead pressure, temperature, temperature survey log data, well temperature transient profile data, fluid flow rate, fluid density, fluid velocity, water production rate, oil production rate, gas production rate, back pressure, composition, chromatographic compositional analysis data, downhole component (valves, etc.) states, gas to liquid ratio, gas to oil ratio, and other data. As above, the one or more sensors 214 may operate to sense continuously or substantially continuously, periodically at regular and/or irregular intervals, or sometimes continuously and sometimes periodically. The rate at which a sensor 214 samples may depend on the nature of the characteristic that the sensor is sensing, including how quickly the characteristic changes or how changes in the characteristic affect production. In certain instances, one or more sensors 214 sample often enough to capture operationally significant changes in the parameter being measured. Further, different of the sensors 214 can operate at different sampling rates. In certain instances, one or more of the sensors 214 may be operated to provide real time data. Likewise, the testing 218 may be performed continuously or substantially continuously, periodically at regular and/or irregular intervals, or sometimes continuously and sometimes periodically and may depend on the type of testing. In certain instances, the some or all of the testing 218 may be performed to provide real time data.

The actuators 216 can be configured to receive a signal (e.g. electronic, optical, hydraulic, mechanical, or other) and substantially instantaneously or with some degree of specified or unspecified delay, automatically actuate their respective component 252 of the wells 204. The signal can provide instructions about a corrective action, for example to make an adjustment to the operation of the component 252 including adjusting the component 252 to an extreme of its operating range (e.g. on/off, open/closed, or other), adjusting the component 252 a specified amount, or other instructions. In certain instances, the actuators 216 can actuate without substantial delay in response to their respective control signal. In certain instances, the signal can be received by a human (e.g. by telephone, e-mail or text message, signal on a control panel display or other user interface, orally, or other) who is directed to actuate, and subsequently actuates in accordance with the signal, the component of the wells 204. In certain instances, the actuators 216 respond to provide real time control of the wells 204 and components 252 thereof.

The system 200 encompasses one or more sensors 220 operable to sense characteristics of the processing and transport system 206 in one or more actuators and/or other regulatory controls (collectively actuators 222) operable to control operation of the processing and transport system 206 and the equipment 258 and 260 thereof. The system 200 also encompasses testing 224 of the processing and transport system 206. In certain instances, the sensors 220 sense pressure, temperature, viscosity, density, flow rate, flow velocities, compositional profiles, operational states of components of the processing and transport system 206, and other characteristics. In certain instances, the actuators 222 are associated with and control some or all of the gathering network equipment 258 and other components involved in the processing and transport of production to the point of sale 208. In certain instances, the testing 224 encompasses testing to determine the condition and operation of the processing and transport system 206. In certain instances, the sensors 220 and/or the testing 224 determine one or more of process flow rate, injection flow rate, process pressure, injection pressure, temperature, fluid flow rate, fluid density, fluid velocity, water production rate, oil production rate, gas production rate, back pressure, composition, component (valves, etc.) states, gas to liquid ratio, gas to oil ratio, component power usage, total production facility power usage, component utility usage, total production facility utility usage, and other data.

As above, the one or more sensors 220 may operate to sense continuously or substantially continuously, periodically at regular and/or irregular intervals, or sometimes continuously and sometimes periodically. The rate at which a sensor 220 samples may depend on the nature of the characteristic that the sensor is sensing, including how quickly the characteristic changes or how changes in the characteristic affect processing and transport of the production. In certain instances, one or more sensors sample often enough to capture operationally significant changes in the parameter being measured. Further, different of the sensors 220 can operate at different sampling rates. In certain instances, one or more of the sensors 220 may be operated to provide real time data. Likewise, the testing 224 may be performed continuously or substantially continuously, periodically at regular and/or irregular intervals, or sometimes continuously and sometimes periodically and may depend on the type of testing. In certain instances, some or all of the testing 224 may be performed to provide real time data.

The actuators 222 can be configured to receive a signal (e.g. electronic, optical, hydraulic, mechanical, or other) and substantially instantaneously or with some degree of specified or unspecified delay, automatically actuate their respective equipment 254 of the processing and transport system 206. The signal can provide instructions about a corrective action, for example to make an adjustment to the operation of the equipment 258 including adjusting the equipment 258 to an extreme of its operating range (e.g. on/off, open/closed, or other), adjusting the equipment 258 a specified amount, or other instructions. In certain instances, the actuators 222 can actuate without substantial delay in response to their respective control signal. In certain instances, the signal can be received by a human (e.g. by telephone, e-mail or text message, signal on a control panel display or other user interface, orally, or other) who is directed to actuate, and subsequently actuates in accordance with the signal, the equipment 258 of the processing and transport system 206. In certain instances, the actuators 222 respond to provide real time control of the processing and transport system 206 and equipment 258 thereof.

The system 200 includes a data center 226 that receives information from the reservoirs 202, wells 204 and the processing and transport system 206 and communicates information to the wells 204, and processing and transport system 206. More specifically, the data center 226 receives data from and communicates information and signals to one or more of the reservoir sensors 210 and testing 212, the wells sensors 214, actuators 216 and testing 218, and the processing and transport sensors 220, actuators 222 and testing 224. The data center 226 acts as a gateway to communicate, as well as embodies memory and data storage to act as a repository of, the data sensed by the sensors, the information determined from the testing, and the operational states of the system components. Additionally, the data center 226 acts as a gateway to communicate and record the information and signals communicated to the sensors, testing and actuators.

The data center 226 is also in communication with other operational components and models of the system 200. In certain instances, the data center 226 is in communication with one or more of an production system model 228, an expert analysis and intelligence component 230, a collaborative decision-making component 232 and an executive action component 234 (collectively "components and models"). The data center 226 receives data from and communicates information and signals to the components and models of the system 200. The data center 226 records the information and signals communicated among the components and models of the system 200, as well as the information and signals communicated between the components and models of the system 200 and the sensors, actuators and testing of reservoirs 202, wells 204 and processing and transport system 206. As such, the data center 226 operates as a repository of information and signals communicated about the system 200. Of note, the data center 226 need not receive data from every component with which it communicates information and signals to, and vice versa. Also, although described herein as directly linking the communication between the operational components and models of the system 200 and the reservoirs 202, wells 204 and processing and transport system 206, the data center 226 can be positioned parallel in the communication between the operational components and models of the system 200 and the reservoirs 202, wells 204 and processing and transport system 206. In other words, the components and models of the system 200 and can communicate directly with the sensors and testing of the reservoirs 202, the wells 204 and the processing and transport system 206, and the data center 226 can operate only to collect and record the information communicated. Moreover, the data center 226 can communicate some or all of the data continuously or substantially continuously, periodically at regular and/or irregular intervals, or sometimes continuously and sometimes periodically. The rate at which data is communicated by the data center 226 can depend on the nature of the data, including how quickly the data is updated and how changes in the data affect production. In certain instances, some or all of the data is communicated quickly enough to capture operationally significant changes in the data. Further, different data can be communicated at different rates. In certain instances, some or all of the data may be communicated in real time to provide real time data.

Figure 3A:
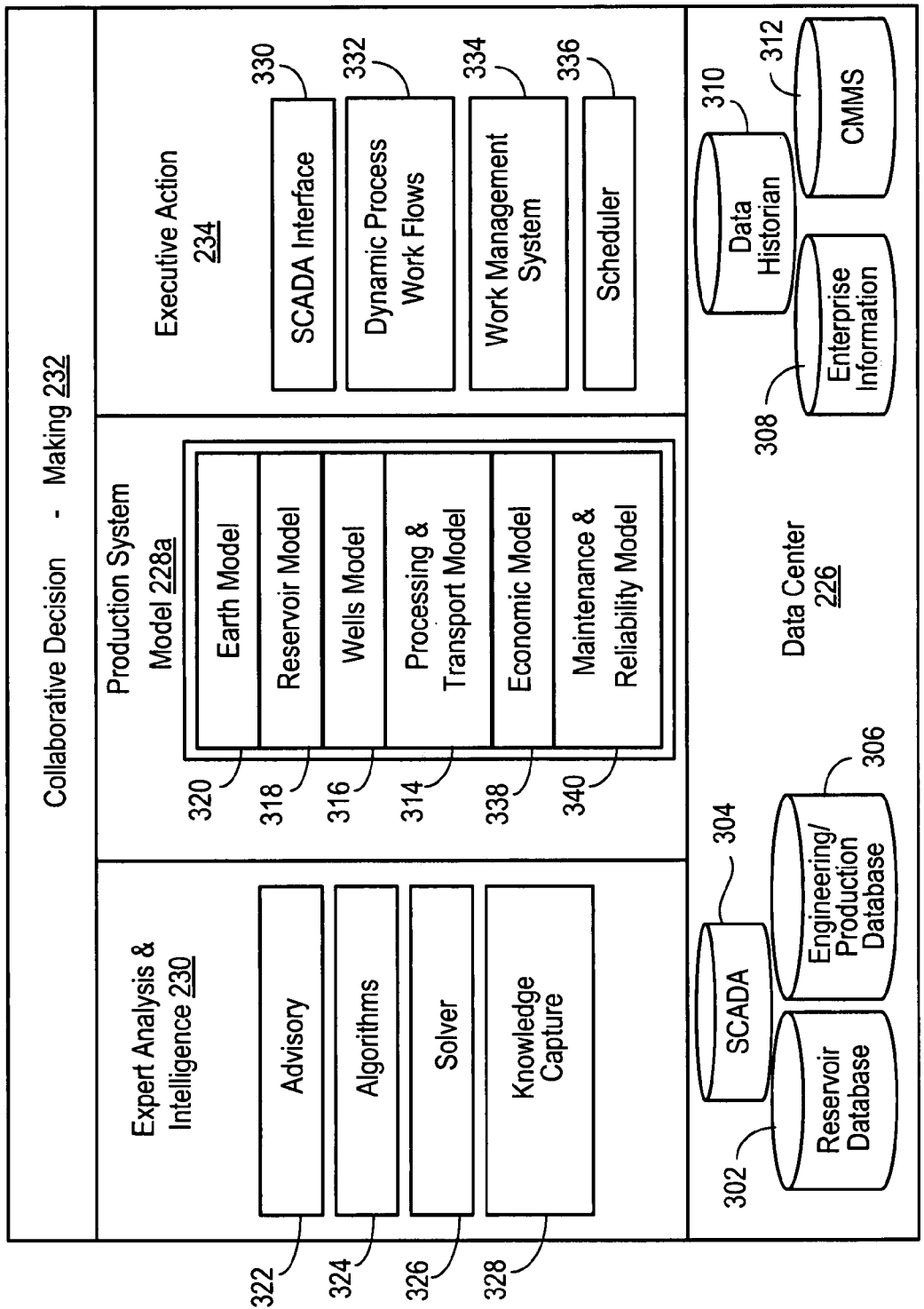
FIG. 3A is a block diagram depicting certain sub-elements of the illustrative production management system of FIG. 2A.
Figure 3B:
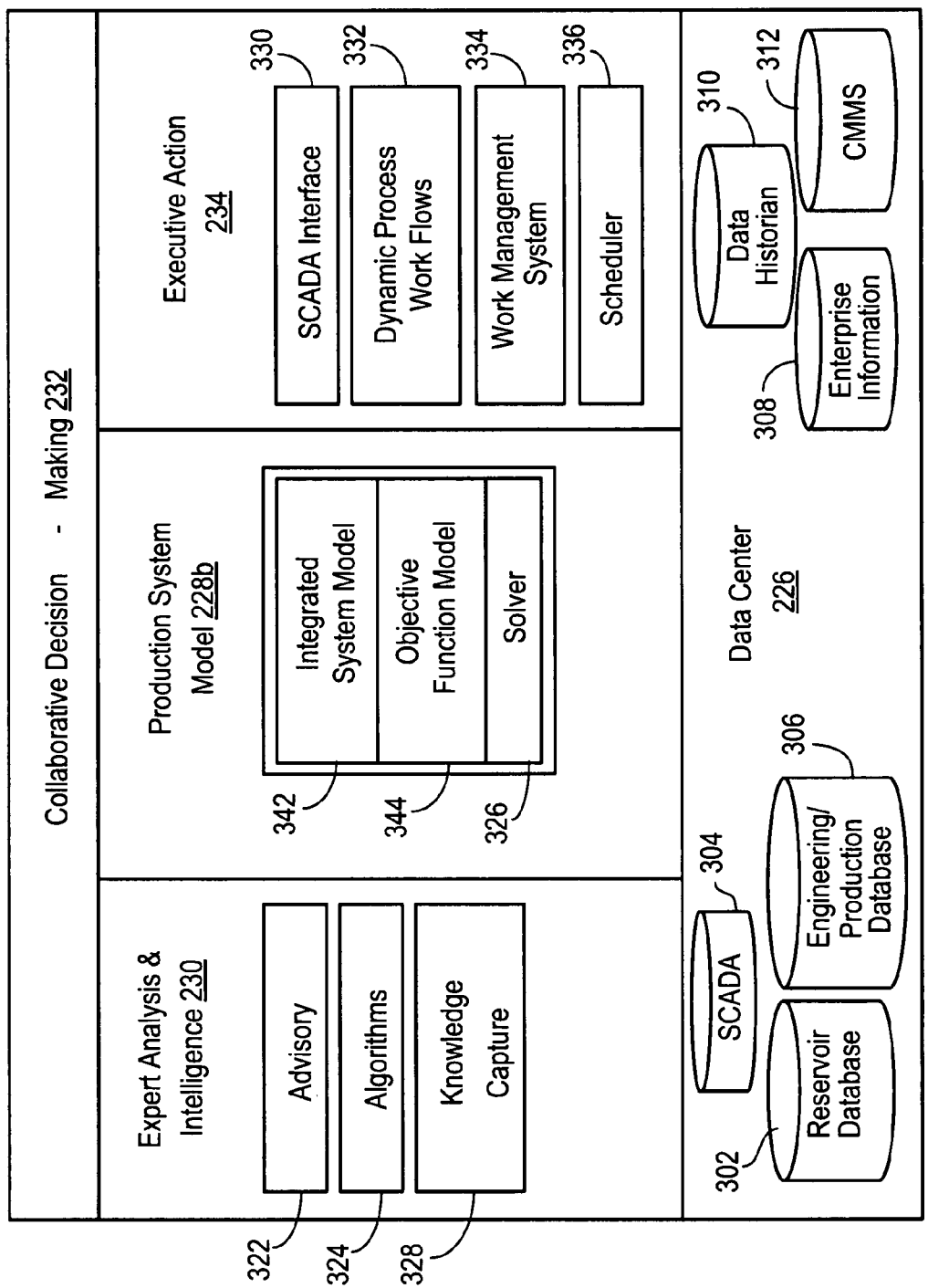
FIG. 3B is a block diagram depicting alternate sub-elements of the illustrative production management system of FIG. 2.A.

Referring to FIGS. 3A and 3B, in certain instances, the data center 226 includes a reservoir database 302, a supervisory control and data acquisition system (SCADA) 304, an engineering/production database 306, an enterprise information system 308, a data historian 310, a computerized maintenance and management system (CMMS) 312, and other data components. The data center 226 may be implemented as software and/or hardware. The components, including the reservoir database 302, the SCADA 304, the engineering/production database 306, the enterprise information system 308, the data historian 310, the computerized maintenance and management system (CMMS) 312, and other data components, may be configured to interact and intercommunicate information. The reservoir database 302 collects information from the sensors and testing performed at the reservoirs 202.

The SCADA 304 monitors the information from the sensors, actuators and testing performed at the reservoirs 202, the wells 204 and the processing and transport system 206, processes the information and presents it to operators in a digestible format (e.g. at a display of a control panel or other user interface), operates alarms and warnings when the characteristics become undesirable, and includes a distributed control system that controls the sensors, actuators and testing. The engineering/production database 306 collects information from the sensors, actuators and testing performed at the wells 204, including information concerning production and injection, and at the processing and transport system 206. The enterprise information system 308 enables enterprise-level accesses to various data stores throughout the data center 226 (e.g. the reservoir database 302, the engineering/production database 306, the data historian 310, and other data stores), systems of the data center 226 (the SCADA 304 and the CMMS 312), and the components and models of the system 200. The CMMS 312 maintains information gathered about the maintenance operations performed at the wells 204 and processing and transport system 206, including maintenance routines, maintenance schedules, maintenance completed, work orders, information about the equipment and devices within the system 200, and other information.

Referring back to FIG. 2A, the production system model 228 may be implemented as software and/or hardware and operable to model the upstream production system, including one or more of the reservoirs 202, the wells 204, or the processing and transport system 206, economic aspects of the upstream production system, maintenance and reliability aspects of the upstream production system, or other aspects of the upstream production system.

Referring to FIG. 3A, in certain instances, the production system model can include a number of first principal sub-models that, in some instances, act in concert and share information to model the upstream production system and account for changes in one sub-model that affect another of the sub-models (herein referred to as production system model 228a). For example, the production system model 228a can include one or more of Earth models 320, reservoir models 318, wells models 316, processing and transport models 314, economic models 338, maintenance and reliability models 340 or other models. With respect to the reservoirs 202, the Earth model 320 models one or more of the geological, geophysical or other characteristics of the reservoirs 202. One example of an Earth model that can be used herein is PETREL, a registered trademark of Schlumberger Technology Corporation. The reservoir model 318 models one or more of permeability, porosity, reservoir pressure, water and oil saturations, stratigraphy, hydrocarbon volumes, reservoir drive mechanisms or other characteristics of the reservoirs 202. One example of a reservoir model that can be used herein is NEXUS, a registered trademark of Landmark Graphics Corporation. The wells model 316 models, among other things, the production and flow characteristics of the wells 204 of the upstream production system, including flow rate at individual wells or across all or a subset of the wells. One example of a wells model that can be used herein is PROSPER, a trademark of Petroleum Experts Ltd. The processing and transport model 314 may model pressures, flow rates, compositions, and other characteristics of the operation of various equipment of the processing and transport system 206. Some examples of processing and transport system models that can be used herein include PIPESIM, a trademark of Schlumberger Technology Corporation, for modeling the gathering and transport system aspects and HYSIS, a registered trademark of Hyprotech Ltd., for modeling aspects of the production facilities. The economic model 338 models one or more of economic return, net present value, payout, profit versus investment ratio or other economic factors across the upstream production system taking into account current product prices, current fixed costs, and/or current variable costs. One example of an economic model that can be used herein is ARIES, a trademark of Landmark Graphics Corporation. The maintenance and reliability model 340 models one or more of mean time between failure or meantime to repair of the components and subcomponents of the upstream production system and/or other operational aspects of the upstream production system. One example of a maintenance and reliability model that can be used herein is MAROS, a trademark of Jardine Technology Ltd. In certain instances, an interface system may operate within the production system model 228*a* to facilitate and/or enable the intercommunication and operation in concert of the first principal sub-models.

As seen in FIG. 3B, in certain instances, the production system model may be a single, comprehensive model that models the reservoirs 202, the wells 204, the processing and transport system 206 and/or other aspects of the upstream production system (hereinafter referred to as production system model 228*b*). Such a production system model 228*b* may include an integrated system model 342 modeling the physical characteristics of the upstream production system, an objective function model 344 modeling the hierarchy of system objectives determined as objective functions as they relate to the upstream production system and subsystems, elements and components and the constraints that affect the upstream production system that may be physical, economic, legislative, operational, organizational or otherwise. The production system model 228*b* may be a full model, having features and modeling commensurate with the first principal models mentioned above, or may be an approximation or proxy for a full model. For example, U.S. Provisional Patent Application No. 60/763,971, entitled Methods, Systems and Computer-Readable Media for Real-Time Oil and Gas Field Production Optimization with Proxy Simulator, and U.S. Provisional Patent Application No. 60/763,973, entitled Methods, Systems and Computer-Readable Media for Fast Updating of Oil and Gas Field Production Models with Physical and Proxy Simulators, and their progeny describe some examples of proxy modeling techniques that can be used in the production system model 228*b*. In certain instances, the production system model 228*b* can be derived from the first principal models 314, 316, 318, 320, and/or other models including the economics model 338, the maintenance and reliability model 340, and/or additional models. In certain instances the production system model 228*b* may be a derived model, for example, derived from upstream production system data and historical data. In certain instances, the production system model 228*b* can be derived from a combination of first principal and derived model components.

In either instance, because the production system model 228 spans the upstream production system, it can communicate information between the portions of the model that model the reservoirs 202, the wells 204, and the processing and transport system 206 to account for changes in one portion of the upstream production system that affect other portions. For example, a change in the reservoirs 202 may have a corresponding impact on the wells 204, and a change in the wells 204 may have an impact on the processing and transport system 206.

In certain instances, a solver module 326 can be provided that operates to test operational scenarios of the upstream production system using the production system model 228 (or some or all of the modules or submodels of the production system model 228) and determine a scenario, and corresponding corrective actions for the components and equipment, that works toward or achieves one or more operational objectives. If not incorporated into the model itself, the solver module 326 can account for the hierarchy of system objectives of the upstream production system and subsystems, elements and components and the constraints that affect the upstream production system that may be physical, economic, legislative, operational, organizational or otherwise. The solver module 326 can be a subset of the expert analysis and intelligence model 230, as in FIG. 3A, a subset of the production system model 228, as in FIG. 3B, or in both. In certain instances, the testing of scenarios may represent multiple decision points in the operation of the upstream production system, and may account for the multiple impacts the range of physical setting options may have on the upstream production system and the objective functions and the constraints that apply to its operation. In certain instances, the time constraints involved to execute a selected decision may be long relative to the scenario testing, and in other instances may necessitate a response without substantial delay. The solver module 326 may operate in providing an automated or partially automated corrective action, in certain instances via automated workflows such as in FIGS. 4 and 6 and in certain instances via orchestrated workflows such as in FIGS. 7-10. In certain instances, the solver module 326 can operate with the production system model 228 to determine corrective actions continuously or substantially continuously, periodically at regular and/or irregular intervals, or sometimes continuously and sometimes periodically. Corrective actions for different aspects of the upstream production system can be determined at different rates. In certain instances, the corrective actions can be determined without substantial delay from the respective operationally significant changes in the upstream production system. In certain instances the corrective actions can be determined in real time. The corrective actions can be interfaced with the executive action module 234 to initiate and/or execute determined corrective actions automatically via advanced process management by interfacing with a SCADA interface component 330 to actuate the actuators 216 and 222, at least in part automatically via orchestrated workflows coordinated by a dynamic process workflow module 332, and/or at least in part automatically through interfacing with the work management system module 334 to enter work activities to the production system work schedule.

The expert analysis and intelligence module 230 can be implemented as hardware and/or software and operates to apply expert knowledge and analysis to analyze operation of one or more of the reservoirs 202, the wells 204, or the processing and transport system 206. Accordingly, the expert analysis and intelligence module 230 can perform one or more of identify enhancement opportunities (deficiencies and improvement opportunities), automatically validate or facilitate decision-makers in validating the identified enhancement opportunities, or automatically determine corrective actions and/or facilitate decision-makers in determining corrective actions to realize the enhancement opportunities. The expert analysis and intelligence module 230 can interface with the executive action module 234 to initiate and/or execute determined corrective actions automatically via advanced process management by interfacing with the SCADA interface component 330 to actuate the actuators 216 and 222, at least in part automatically via orchestrated workflows coordinated by the dynamic process workflow module 332, and/or at least in part automatically through interfacing with the work management system module 334 to enter work activities to the production system work schedule. In one example, the expert analysis and intelligence module 230 may receive information on the operation of the system 200 from the data center 226, automatically (i.e. without human input) compare that information to one or more operational objectives and identify corrective actions. The comparisons can be performed continuously or substantially continuously during operation of the system, periodically at regular and/or irregular intervals, or sometimes continuously and sometimes periodically. The rate at which comparisons can be performed can depend on the nature of the data being compared, including how quickly the underlying characteristic changes or how changes in the underlying characteristic affects the system. Different data can be compared at different rates. In certain instances, one or more of the comparisons can be performed in real time. Likewise, the corrective actions can be determined continuously or substantially continuously during operation of the system, periodically at regular and/or irregular intervals, or sometimes continuously and sometimes periodically. The rate at which determinations can be performed can depend on the nature of the corrective action, how the determination is being made, and the data used, including how quickly the underlying characteristics change or how changes in the underlying characteristics affect the system. Different determinations can be performed at different rates. In certain instances, one or more of the determinations of corrective actions can be performed in real time.

In certain instances, as depicted in FIG. 3, the expert analysis and intelligence module 230 may include an advisory sub module 322 implemented as software and/or hardware operable to receive inputs from other modules of the system 200, including information on enhancement opportunities, and indicate that enhancement opportunities have been identified. The information on enhancement opportunities may be derived from actual data from the data center 226 and modeled or expected data from the production system model 228 via the solver 326 or via specified algorithms in the algorithms module 324 (e.g. standards or targets, including performance standards), and identified variances between the expected operation or specified standards/targets and actual operation of the reservoirs 202, wells 204, and processing and transport system 206. Together or individually, the algorithms sub module 324, the solver module 326 and a knowledge capture module 328 operate as an expert system. The knowledge capture module 328 operates as a repository of expert knowledge about the upstream production system and interfaces with the advisory module 322 to present information about conditions detected across the upstream production system. The algorithms sub module 324 applies algorithms to data received from the production system model 228 and other modules of the system 200 to aid in interpreting the data. The solver module 326, as mentioned above, tests scenarios against the production system model 228 over the system 200 and other modules of the system 200 to aid in interpreting the data and in determining future data consistent with the operation objectives of the upstream production system.

In facilitating decision-makers in validating and determining corrective actions, the expert analysis and intelligence module 230 may provide analysis and information about the system subset (e.g. specifications, as-designed characteristics, process and instrument diagrams, numerical modeling, historical failure and repair information, access to expert systems concerning the system subset, analysis of possible causes for the deficiency or enhancement opportunity, and other analysis and information) to the decision-makers via the collaborative decision-making module 232. The expert analysis and intelligence module 230 may automatically provide or the decision-makers may query the expert analysis and intelligence module 230 for the information and analysis. The analysis and intelligence may include one or more recommended actions. The decision-makers may interact with the expert analysis and intelligence module 230 or alternatively by testing scenarios against the production system model 228 via the collaborative decision-making module 232 to determine the effectiveness of various possible actions and use that information in selecting the action that will be taken.

The corrective actions can include corrective actions on wells 204, the processing and transport system 206 and/or the production management system 200 itself. In certain instances, the corrective action on the wells 204 can include adjusting at least one of a production rate from or an injection rate to one or more wells using surface and/or downhole valves, chokes, pumps, artificial lift devices, or other flow control devices. Adjusting the production/injection rate can include initiating and/or executing one or more well intervention activities on one or more wells. For example, the well intervention activities can include one or more of well stimulation, well fracturing, downhole device maintenance or other activity. Adjusting the production/injection rate can include isolating one or more reservoirs or subterranean zones. Adjusting the production/injection rate can include implementing design changes. In certain instances, the corrective action can include initiating an adjustment to and/or adjusting the production plan and/or a well plan (including specifying new wells and/or re-working or re-drilling existing wells).

In certain instances, the corrective action on the gathering and transport network 254 of the processing and transport system 206 can include one or more adjusting an amount of a flow through a pipe, adjusting a pressure of a flow supplied through a pipe, adjusting a flow rate of a flow supplied through a pipe, adjusting a valve, adjusting a choke, adjusting a flow control device, adjusting a compressor, adjusting a pump, adjusting a heater, and adjusting a cooler. In certain instances, the corrective action on the production facility 260 of the processing and transport system 206 can include one or more adjusting an amount of a flow supplied to a separator, adjusting the pressure of a flow supplied to the separator, adjusting a flow rate of a flow supplied to a separator, adjusting an amount of a flow supplied to a dehydrator, adjusting the pressure of a flow supplied to the dehydrator, adjusting a flow rate of a flow supplied to a dehydrator, adjusting a valve, adjusting a choke, adjusting a flow control device, adjusting a compressor, adjusting a pump, adjusting a heater, adjusting a cooler, or adjusting a fluid level. Adjusting the processing and transport system 206 can include diverting flow to control the hydraulic balance between different flow paths and/or process trains, to facilitate well testing or intervention, to facilitate equipment or component testing or repair/service, to isolate wells, equipment or components, or other reasons. Adjusting the processing and transport system 206 can include adjusting treatment rates, for example methanol or corrosion injection rates. Adjusting the processing and transport system 206 can include controlling utility usage, such as electric, gas, refrigeration, steam and/or compressed air usage. Adjusting the processing and transport system 206 can include controlling the safety systems, such as emergency shut down valves, deluge and flare systems and/or other systems. Adjusting the processing and transport system 206 can include implementing preventative or corrective maintenance and/or design changes.

Once a corrective action has been determined, either by the decision-maker or automatically, that corrective action may be implemented on the production system subset (e.g. adjust operation, repair, replace equipment or other) or may make a change to the production system model 228 or expert analysis and intelligence module 230 (e.g. update model, adjust analysis, or other). Adjustments may be made to the system continuously or substantially continuously, periodically at regular and/or irregular intervals, or sometimes continuously and sometimes periodically. Different adjustments can be made at different rates. In certain instances, one or more of the adjustments can be performed in real time. More detailed examples of certain implementations of the system 200 are described below with reference to FIGS. 4-10.

Referring again to FIG. 2A, the executive action module 234 operates to drive and track the progress of a plurality of work flows that operate within the system 200 in managing the reservoirs 202, the wells 204, and the processing and transport system 206. The executive action module 234 drives operation of the upstream production system by prompts from the data center 226, the production system model 228, the expert analysis and intelligence module 230, and the collaborative decision-making module 232. The executive action module 234 can further coordinate communication of information between the data center 226, the production system model 228, the expert analysis and intelligence module 230, and the collaborative decision-making module 232 using a scheduler module 336 that initiates communication of information, in one instance, according to a predetermined frequency or time frame and/or, in another instance, upon occurrence of specific events to provide information to the proper module for the module to perform its role in system 200 management. The executive action module 234 can be implemented as software and/or hardware.

In certain instances, as depicted in FIG. 3, the executive action module includes SCADA interface 330, dynamic process work flows 332, a work management system 334, and a scheduler 336 implemented as software and/or hardware. The SCADA interface 330 receives one or more set points (i.e. corrective actions) for various components of the wells 204 and the processing and transport system 206 and communicates the set points to the SCADA 304 which automatically controls the operation of the wells 204 and the processing and transport system 206 (for example, via signals to actuators 216 and 222) to set and/or maintain the set points. In maintaining the set points, the SCADA 304 may operate a feedback loop, receiving data on actual operation from the data center 226, comparing the actual operation to the set point, and if a variance exists determining and implementing an adjustment to attain the set points. The feedback loop may be operated continuously or substantially continuously, periodically in regular and/or irregular intervals or sometimes continuously and sometimes periodically. In certain instances, the feedback look may be performed in real time. The set point may be derived from actions specified by a decision-maker via the collaborative decision-making module 232, automatically from the expert analysis and intelligence module 230, automatically or semi-automatically from a work flow of the executive action module 234, automatically from the production system model 228 or other. The SCADA 304 may be implemented to control both on an equipment or component level as well as on a larger subset of the upstream production system (e.g. the wells 204, the processing and transport system 206, or other subset thereof).

The work management system 334 coordinates performance of work (e.g., corrective actions), such as adjustment, maintenance, repair or replacement of components and equipment, throughout the system 200. For example, in certain implementations, the work management system coordinates the scheduling and assignment of personnel and work orders to perform work on the reservoirs 202, wells and 204, and processing and transport system 206, as well as other components of the system 200. The work management system 334, in certain implementations, may also track status and/or completion of work orders.

The dynamic process work flows 332 include one or more work flows that operate to drive performance of the system 200 in managing the upstream production system. The work flows 332 coordinate how task in the system's operation are structured, who/what performs them, what their relative order is, how they are synchronized, how information flows to support the tasks and how tasks are tracked. The dynamic process work flows 332 drive production operations, model updates, production loss reporting, maintenance, and other activities in management and operation of the upstream production system and the production management system 200. For example, in some implementations, the dynamic work flows 332 operate drive the expert analysis and intelligence module 230 in identifying enhancement opportunities and drive the collaborative decision-making module 232 in prompting decision-makers for input in validating enhancement opportunities and/or implementing actions to realize the identified enhancement opportunity. The dynamic work flows 332 may further operate to drive and coordinate implementation of the actions selected to realize the identified enhancement opportunities. For example, the dynamic work flows 332 may prompt maintenance or adjustments to the wells 204, the processing and transport system 206, and/or actuators 216, 222 thereof. In some instances, the dynamic work flows 332 coordinate with the work management system 334 and SCADA interface 330 to implement adjustments. In certain instances, the work flows 332 are dynamic in that the workflows orchestrate human and/or system interaction as and when enhancement opportunities are identified, such that the opportunities can be better realized in a timeframe consistent with the opportunity. In certain instance, the work flows 332 are wholly automatic. In certain instances, the work flows 332 operate in providing real time control of the upstream production system. Some example dynamic process work flows 332 are described in more detail below with reference to FIGS. 4-10

The collaborative decision-making module 232 operates as an interface between the organization responsible for management and operation of the upstream production system (including, for example, decision-makers, operations, maintenance, engineering support personnel and certain suppliers and vendors) and the other aspects of the system 200. The communication may take place via a computer accessed enterprise information portal, such as a network or Internet based portal, that collects or receives information from the components of the system 200 and displays it to the user in an easily digestible format. The portal may be accessed via numerous types of computer devices including personal computers, hand-held personal assistants, stationary or mobile telephones, dedicated devices, remote terminals, and other devices. The portal may allow user customization. Information in the portal may be arranged in a hierarchical fashion, presenting high-level information into which the user can drill down for more detailed or related information. Similar or other communication may take place via messages directed to or received from one or more members of the community of practice, electronic or otherwise, including SMS, e-mail, text messages, audio messages and/or other types of messages. In any instance, the easily digestible format may include textual information, graphical representations of information, audible information and/or other forms of information. For example, the information may be arranged in graphs, charts, flow charts showing work flows, three-dimensional facilities and well walk-throughs, graphical representations of pressure, temperature, flow, and other characteristics, three-dimensional models of the reservoirs 202, the operation of the wells 204 and the processing and transport system 206, and other forms of information. The information supplied to the collaborative decision making module 232 (and thus the portal or other communication modes) can be updated continuously or substantially continuously, periodically at regular and/or irregular intervals, or sometimes continuously and sometimes periodically. Different information can be updated at different rates. In certain instances, the information can be real time information. U.S. Published Patent Application No. 2004/0153437, entitled Support Apparatus, Method and System for Real Time Operations and Maintenance, describes one example of a system that can be used in implementing a collaborative decision making module herein.

Because the system 200 operates across the upstream production system, information collected from different aspects of the upstream production system can be presented together. For example, information from one or more of the reservoirs 202, wells 204, and processing and transport system 206 can be analyzed together to provide a larger picture of the upstream production system's conditions and operation. In some instances, the data can express the interrelationship between data of one aspect of the upstream production system to that of another aspect of the upstream production system in a manner that cannot be done if the reservoirs 202, wells 204, and processing and transport system 206 are analyzed as separate entities. For example, one or more actions to realize an enhancement opportunity in the wells 204 may require a change in the processing and transport system 206 to be fully realized or may negatively or positively impact the operation of the processing and transport system 206 or the reservoirs 202. Likewise one or more actions to realize an enhancement opportunity in the processing and transport system 206 may require a change in the wells 204 to be fully realized, or may negatively or positively impact the operation of the wells 204 or the reservoirs 202. Therefore, by selecting an action based on its larger impact across the system, better decisions about actions can be made.

Figure 4:
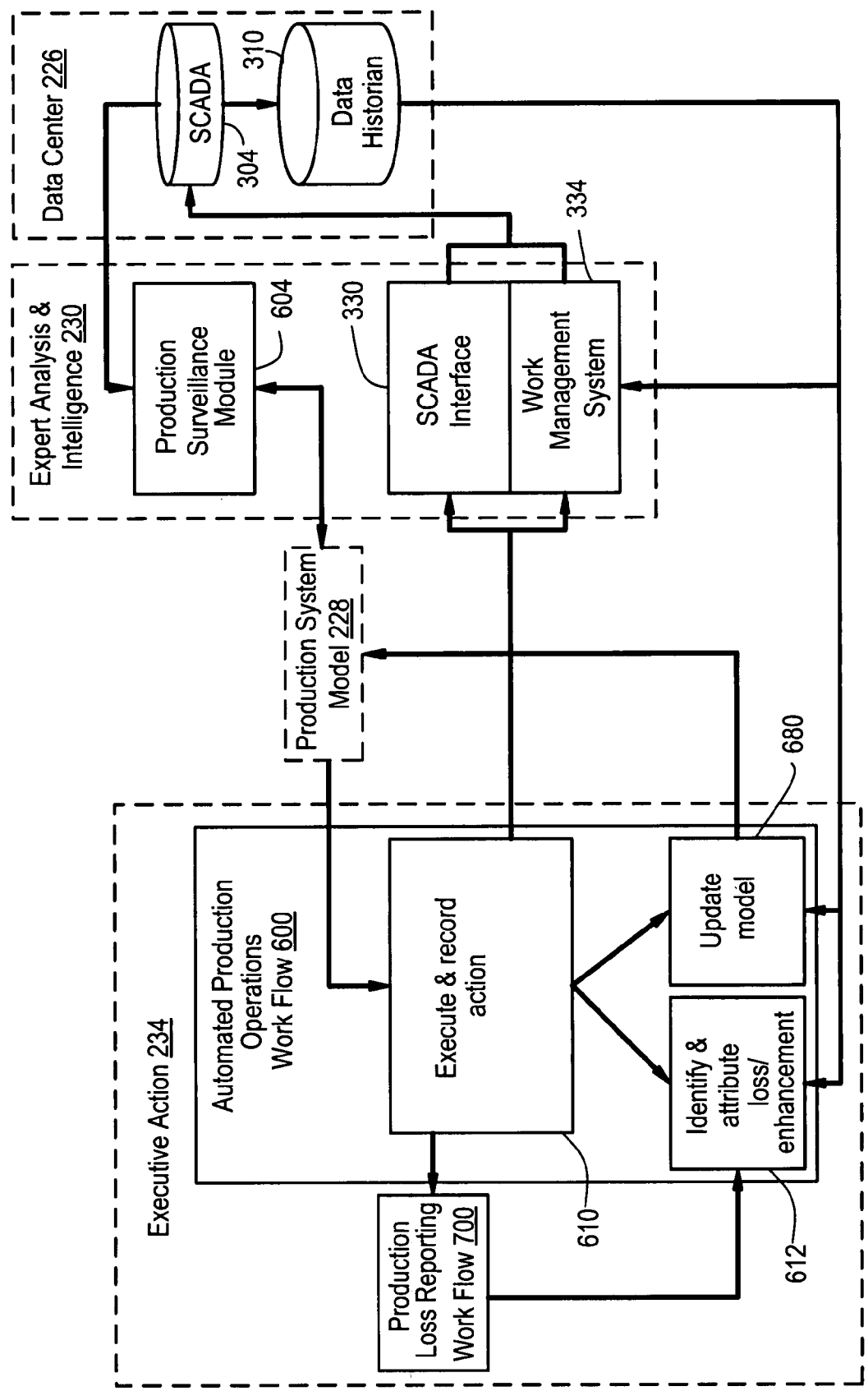
FIG. 4 is a block diagram of an illustrative automated production operations workflow of the illustrative production management system of FIG. 2A.

Turning now to FIGS. 4-10, illustrative workflows of the system 200 are described. FIG. 4 depicts an illustrative automated production operations workflow 600 that works to operate the actual production 120 from the upstream production system. In certain instances, the automated production operations workflow 600 is implemented as software and/or hardware, and can operate production from the upstream production system in relation to operational objectives. For example, the workflow 600 may operate the upstream production system toward or to achieve one or more of the operational objectives.

In operation, the production system model 228 automatically receives data from the data center 226 and the production surveillance module 604. The data may be received continuously or substantially continuously, periodically at regular and/or irregular intervals, or sometimes continuously and sometimes periodically. Different data may be received at different rates. In certain instances, the data can be received without substantially delay, and in some instances the data can be real time data. Using the data, the production system model 228 automatically determines control settings for the actuators, for example actuators 216 and 222, to control the upstream production system. In certain instances, the production system model 228 can also determine control settings for components and equipment that are not controlled by actuators, but that must be controlled manually. The control settings are selected to work toward or achieve the one or more operational objectives, and can be determined, for example, by the solver 326 operating a number of scenarios with the integrated system model 342 and objective function model 344 (or models 314-320). In one example, the control settings can yield corrective actions that implement a set of producing and shut down wells and a product flow rate and pressure from the producing wells to maximize usage of available gathering and transport network 254 and/or production facilities 256 capacity. In another example, where the gathering and transport network 254 includes more than one flow route to communicate product and/or where the production facilities 256 can perform parallel processing of product, the control settings can implement valve, choke and other flow control settings to optimally or near optimally balance the flow between the available flow paths.

At operation 610, actions to implement the corrective actions are initiated and executed on the reservoirs 202, the wells 204 and/or at the processing and transport system 206, and information concerning the corrective action is recorded. At least the initiation of implementing the control settings is performed automatically and the execution may also be performed automatically. The execution and recording of the action can be performed via the SCADA interface 330 and/or work management system 334. The work management system 334, as discussed above, operates in coordinating scheduling, assignment of personnel, work orders and other aspects of implementing the action. In certain instances, an adjustment via an actuator, such as actuators 216 and 222, may be performed via the SCADA interface 330. In certain instances, an adjustment to components or equipment that are controlled manually or an adjustment that is of a nature that it cannot be performed by the SCADA interface may be performed via the work management system 334. In some instances, the action may be initiated and/or implemented substantially instantaneously, or without substantial delay, for example via a signal to an actuator 216 of the wells 204 and/or an actuator 222 of the processing and transport system 206. The action may also be implemented automatically or in whole or in part by human intervention. For example, the nature and magnitude of the corrective action (e.g., adjust a specified valve a specified amount) can be communicated to a human via the work management system 334.

At operation 612, described below, operation of the reservoirs 202, wells 204 and/or processing and transport system are monitored to identify a change in operation, and attribute the changes with the respective actions that caused them. In this way, the system 200 enables analysis of the actions to see whether they were successful in realizing the enhancement opportunities. At operation 680, described below, the production system model 228 is updated.

One or more of the determining control settings, initiating and executing the control settings, or monitoring and attributing the changes to the operations can be performed without substantial delay from the occurrence of operationally significant changes in the data (i.e. measured or tested parameters), and in some instances can be performed in real time. If the data is collected continuously or substantially continuously, in rapid enough time intervals (depending on the type of data), or in real time data, the production operations work flow 600 can operate to take corrective action substantially concurrently with the changes in the actual production 120, and in some instances in real time.

Figure 5:
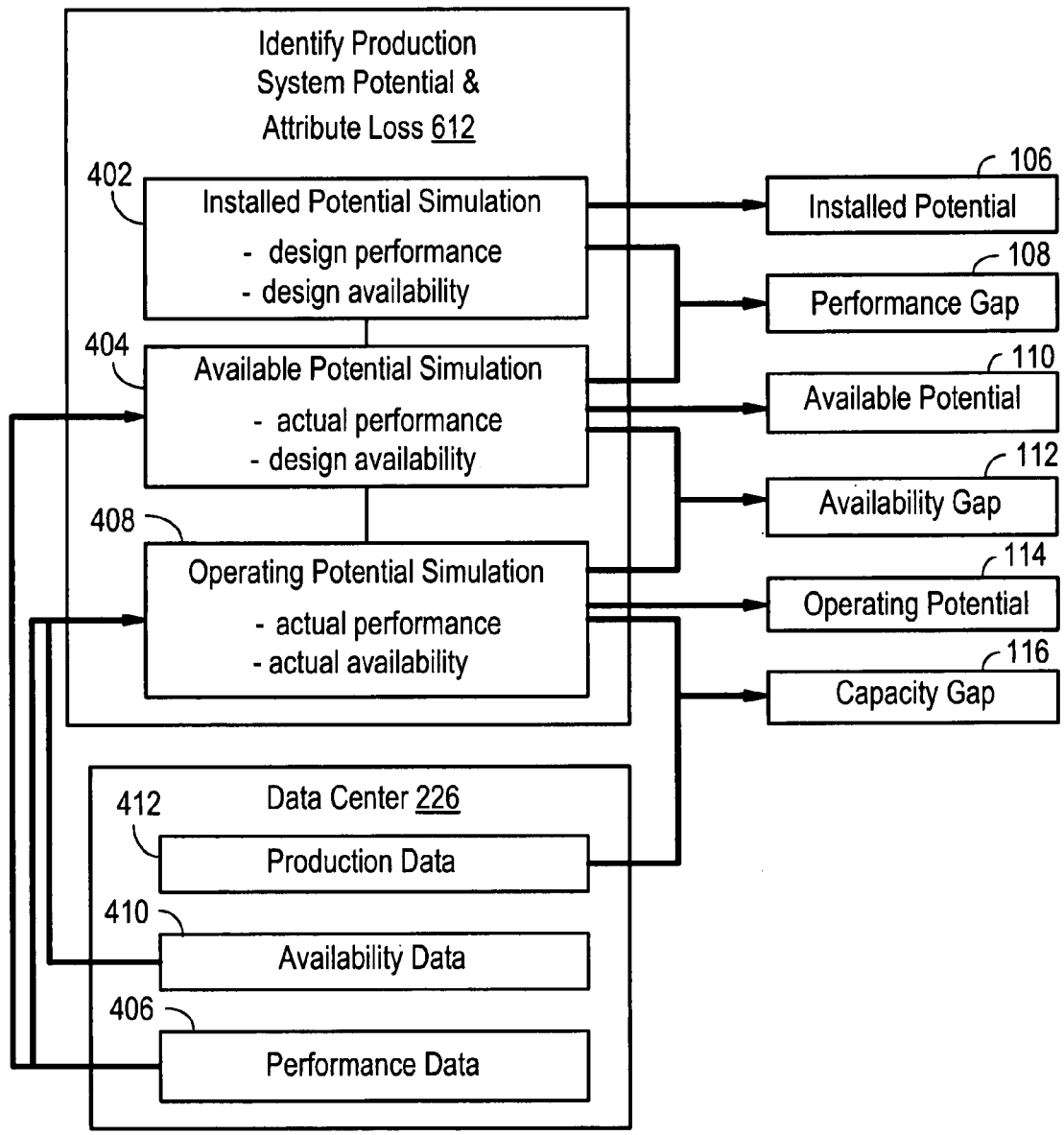
FIG. 5 is a block diagram depicting operation of the illustrative production management system of FIG. 2A in determining upstream production system potentials and deferment gaps

Referring now to FIG. 5, in identifying production system potential and attributing loss, operation 612, the system 200 can determine the installed potential 106, the performance gap 108, the available potential 110, the availability 112, the operating potential 114 and the capacity 116. At operation 402, the installed potential 106 can be determined by simulating operation of the upstream production system with as-designed parameters. That is, the installed potential 106 is determined assuming that the reservoirs 202, wells 204 and processing and transport system 206 operate as expected or intended, and assuming that the equipment, materials, and personnel necessary to achieve and maintain the operation of the reservoirs 202, wells 204 and the processing and transport system 206 at the expected or intended levels are available. At operation 404, the available potential 110 can be determined by simulating operation of the upstream production system with as-designed availability, but using the actual performance data 406 collected by the data center 226. As noted above, the data center 226 collects actual performance data from sensors 210 and testing 212 of the reservoirs 202, sensors 214 and testing 218 of the wells 204, and sensors 220 and testing 224 of the processing and transport system 206. The performance gap 108 can be determined as a function of the difference between the installed potential 106 and the available potential 110. At operation 408, the operating potential 114 can be determined by simulating operation of the upstream production system with actual performance data and actual availability data collected by the data center 226. The availability gap 112 can be determined as a function of the difference between the available potential 110 and the operating potential 114. Further, the capacity gap 116 can be determined as a function of the difference between the operating potential 114 and the production data 412.

In each instance, if the data is collected continuously or substantially continuously, in real time, or in rapid enough time periods, the production system model 228 can be operated to determine the performance gap 108, the available potential 110, the availability gap 112, the operating potential 114 and the capacity gap 116 temporally proximate to operational changes in the upstream production system. Of note, changes in the production data 412, the availability data 410, and the performance data 406 may not occur at the same rate. For example, performance data 406 may not yield a significant change for a matter of weeks, months or years. This is because degradation of the operating performance of the reservoirs 202, wells 204, and processing and transport system 206 (of which production data 412 represents) occurs over a long period of time. In a specific example of the reservoirs 202, changes in the conditions that make extraction of products more difficult and/or the depletion of easily reachable product occurs over a number of years. In a specific example of the wells 204 or the processing and transport system 206, wear, clogging, and failure of equipment and hardware likewise occurs over a long period of time, such as weeks, months, or years. In contrast, production data 412 may yield a significant change in a matter of seconds, minutes or hours. This is because the results of failure of components and subcomponents of the upstream production system to be optimally set up or adjusted to achieve the operating potential occur rapidly. For example, if a valve in the wells 204 or the processing and transport system 206 is maladjusted, it will have a substantially immediate impact on the flow that can be measured and corrected. The availability data 410 may yield a significant change in a matter of hours, days or weeks.

Figure 6:
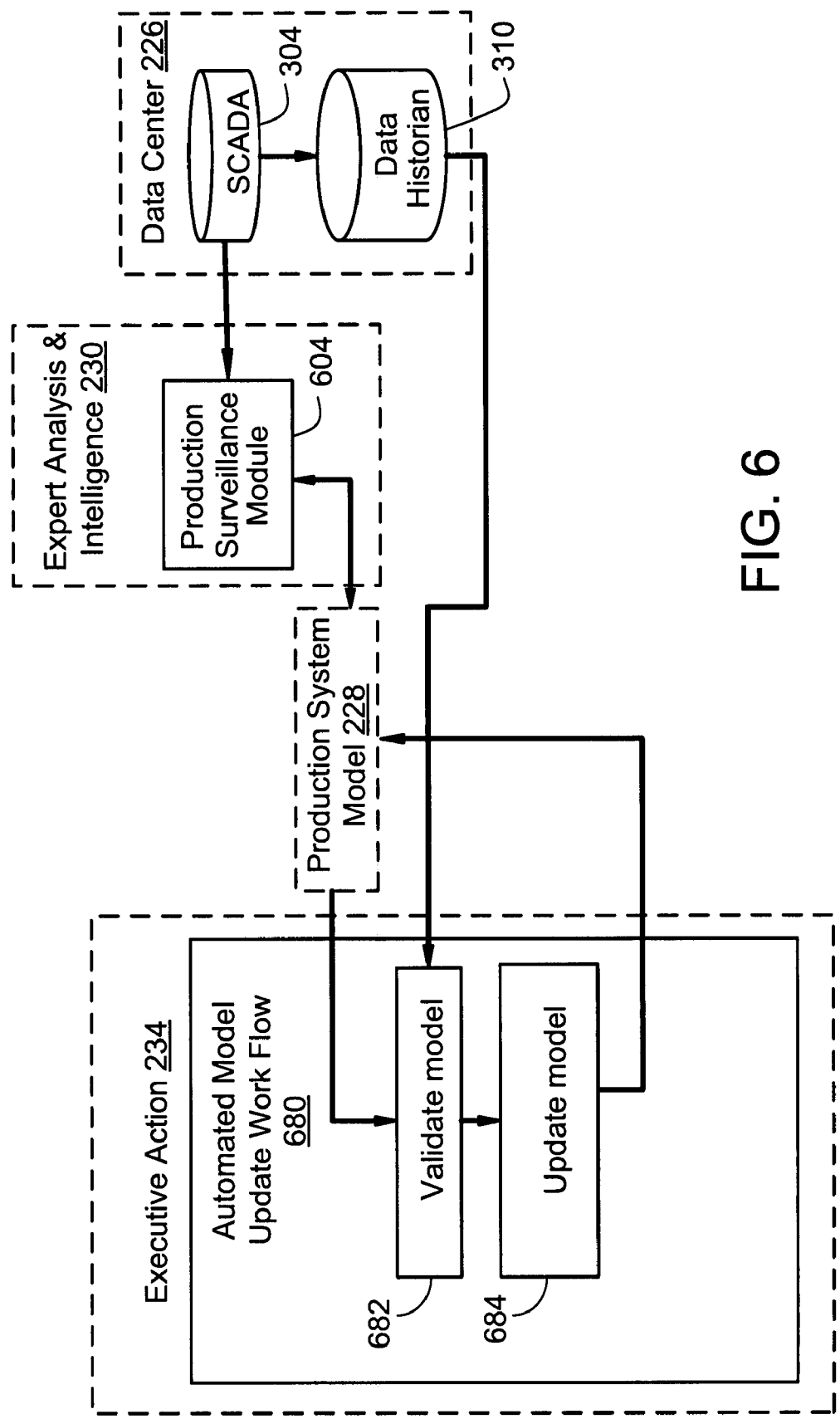
FIG. 6 is a block diagram of an illustrative automated model update of the illustrative production management system of FIG. 2A.

Referring now to FIG. 6, an illustrative automated model update 680 that operates to automatically update the production system model 228 is schematically depicted. The automated model update 680 can be implemented as software and/or hardware, and can operate in parallel with other workflows, for example the automated production operations workflow 600 or the orchestrated production operations workflow 650 (described below), or the operation of one or more other workflows may be ceased during operation of the automated model update 680. The automated model update 680 can receive information from one or more of the other workflows. The automated model update 680 can update a production system model 228 having first instance models, such as models 314-320, 338 and 340 depicted in FIG. 3A, or a production system model 228 having an integrated system model 342, objective function model 344 and solver 326 depicted in FIG. 3B. By updating the production system model 228, the production system model 228 can maintain accurate modeling of the upstream production system.

In operation, the production system model 228 automatically receives data from the data center 226 and the production surveillance module 604. The data may include current or substantially current data (including real time data), for example obtained from the SCADA 304, and historical data, for example obtained from the data historian 310. At operation 682 the production system model 228 is automatically validated against the data. In validating the production system model 228, simulations from the production system model 228 are compared against the actual data received from the data center 226. The production system model 228 is operated in determining whether any differences stem from changes in the upstream production system, inaccuracies in-built into the production system model 228 (e.g. inaccurate assumptions or modeling), or because of faulty data. If the production system 228 is inaccurate (i.e. the differences do not stem from faulty data), it is determined the production system model 228 needs updating. The validating operation can be continuously or substantially continuously performed during operation of the production management system 200, periodically at regular and/or irregular intervals, or sometimes continuously and sometimes periodically. Different aspects of the production system model 228 (including different of the first principal models 314-320, 338, and 340) can be validated at different rates.

At operation 684, the production system model 228 can be updated, for example by adjusting the assumptions on which the model is based, the algorithms from which the simulations are derived, the constraints under which the simulations are solved, and/or other aspects to improve the match between the simulation results and the actual data. The production system model 228 occasionally needs updating or adjustment, for example, because the parameters on which the model is based may be determined early in the upstream production system's lifecycle. As the upstream production system operates, more data is accumulated from which to better estimate the parameters. Moreover, some parameters change over the system's lifecycle. In one example, the initial parameters for the reservoir modeling aspects of the production system model 228 are based on seismic and/or log data. As the production system is produced, the parameters can be better estimated using production data and history matching. One or more of permeability, porosity, water-oil contacts, fault transmissibility, aquifer porosity, rock pore volume or other parameters can be updated in the reservoir modeling aspects of the production system model 228 using production data. In another example, the components and equipment of the upstream production system foul and/or the performance degrades during operation. The upstream production system model can be updated to account for the fouling and/or performance degradation, for example by determining and applying one or more of skin factors, heat exchanger fouling factors, pump efficiencies, compressor efficiencies, turbine efficiencies, pipe friction factors, valve friction factors and other factors. In yet another example, the fluids produced change over time. Fluid properties determined by the sensors and testing can be used in updating the production system model 228 to account for changes in fluids over time. Other aspects and parameters of the production system model 228 can be updated.

In certain instances, specified limits of adjustment can be defined, such that if an adjustment beyond the specified limit is needed to update the production system model 228, an alert can be communicated to person or persons with supervisory authority (e.g. via the collaborative decision-making module 232). The supervisory authority may then review the situation to validate or deny the adjustment beyond the specified limit.

Once the update to the model is determined, the adjustment is initiated and executed at operation 684 and input back into the production system model 228. At least the initiation operation is performed automatically, and the execution may also be performed automatically. Updating the model can be continuously or substantially continuously performed during operation of the production management system 200, periodically at regular and/or irregular intervals, or sometimes continuously and sometimes periodically. Different aspects of the production system model 228 (including different of the first principal models 314-320, 338, and 340) can be updated at different rates. One or more of the validating the model, initiating and executing the model update can be performed without substantial delay from the occurrence of operationally significant deviations of the model from the actual upstream production system, and in some instances can be performed in real time.

Figure 7:
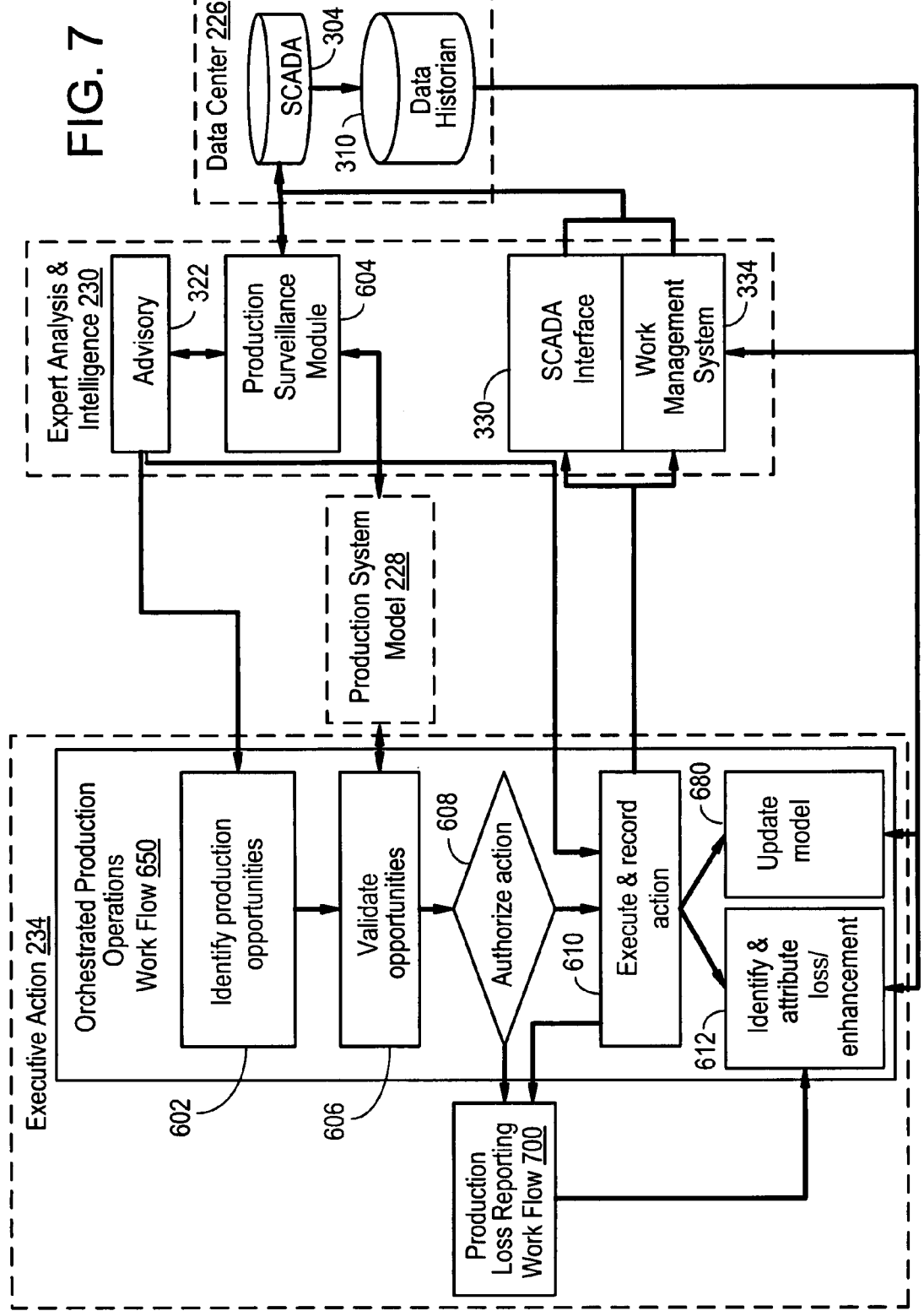
FIG. 7 is a flow diagram depicting operation of an illustrative orchestrated production operations work flow of the illustrative production management system of FIG. 2A.

Turning now to FIG. 7, an illustrative orchestrated production operations work flow 650 that works to operate the actual production 120 is schematically depicted. The illustrative production operations work flow 650 may be implemented by software and/or hardware and can operate production from the upstream production system in relation to one or more operational objectives. For example, the workflow 650 may operate the upstream production system toward or to achieve one or more of the operational objectives mentioned above. By increasing or maximizing the actual production 120, the capacity gap 116 is reduced or minimized.

At operation 602, production enhancement opportunities are automatically identified. Production enhancement opportunities can be identified in a number of ways. For instance, the operation of the reservoirs 202, the wells 204, and/or the processing and transport system 206 may be monitored via the production data 412 and compared against the expected operation determined by the production system model 228 or specified production targets to determine whether the operation is meeting the expected or specified operation. The expected operation or specified production target may be derived as a function of the operating potential 114. In another instance, the operation of components and equipment of the reservoirs 202, the wells 204 and/or the processing and transport system 206 may be monitored via the production data 412 and compared against instructions sent to the components and equipment (as determined by or using the production system model 228 in accordance with one or more operational objectives) to determine whether the components and equipment are operating according to the operational objectives. Such comparisons, and other comparisons, to determine production enhancement opportunities, are monitored by a production surveillance module 604. In certain instances, production enhancement opportunities may be identified via an advisory through the advisory module 322. The advisory may include not only an indication of the production enhancement opportunity, but also its magnitude and possible reasons for the resulting capacity gap.

At operation 606 the opportunities identified in operation 602 are validated against the production system model 228. In certain instances, the opportunities can be automatically validated and/or validated by or with human intervention, for example via the collaborative decision-making module 232. Once it is determined whether an opportunity is valid, at operation 608 an action to address the opportunity may or may not be authorized. For example, if the opportunity is to be authorized by a person or persons with supervisory authority, such person or persons is prompted to review the opportunity, and if necessary validate or further validate the opportunity, and approve or disprove the opportunity via the collaborative decision-making module 232. If action is not authorized, operations proceed to the production loss reporting work flow 700 described below. At operation 610, the authorized action is executed on the reservoirs 202, the wells 204 and/or the processing and transport system 206 and information concerning the action is recorded. In certain instances, the orchestrated production operations work flow 650 can be configured to by-pass operations 602-608 if the identified corrective action is within specified limits. The specified limits may dictate one or more of the magnitude of the adjustment, the nature of the adjustment, the specific components or equipment being adjusted, or other limits. Whether or not operations 602-608 are by-passed, the possible actions may include updating one or more of the operational objectives, adjusting the operation of one or more components and equipment of the wells 204 and/or processing and transport system 206 (e.g. via the actuators 216, 222), or other actions. The execution and recording of the action is performed via the SCADA interface 330 and/or the work management system 334. The work management system 334, as discussed above, operates in coordinating scheduling, assignment of personnel, work orders and other aspects of implementing the action. In certain instances, an adjustment to components or equipment that are controlled manually or an adjustment that is of a nature that it cannot be performed by the SCADA interface may be performed via the work management system 334. In some instances, the action may be initiated and/or implemented substantially instantaneously, or with little delay, for example via a signal to an actuator 216 of the wells 204 and/or an actuator 222 of the processing and transport system 206. The action may also be implemented automatically or in whole or in part by human intervention. For example, the nature and magnitude of the corrective action can be communicated to a human via the work management system 334.

At operation 612, operation of the reservoirs 202, wells 204 and/or facilitates are monitored to identify a change in operation, and attribute the changes with the respective actions that caused them. In this way, the system 200 enables analysis of the actions to see whether they were successful in realizing the enhancement opportunities.

Some or all of the operations 602-612 can be performed automatically, enabling management by exception from the decision-makers. The operations may be performed continuously or substantially continuously, periodically in regular and/or irregular intervals, or sometimes continuously and sometimes periodically. Different operations can be performed at different rates. In certain instances, one or more or all of the operations are performed in real time. If the data is collected continuously or substantially continuously, in rapid enough time intervals (depending on the type of data), or in real time data, the production operations work flow 650 can operate to identify production enhancement opportunities, and can take corrective action substantially concurrently with the changes in the actual production 120, and in some instances in real time.

Figure 8:
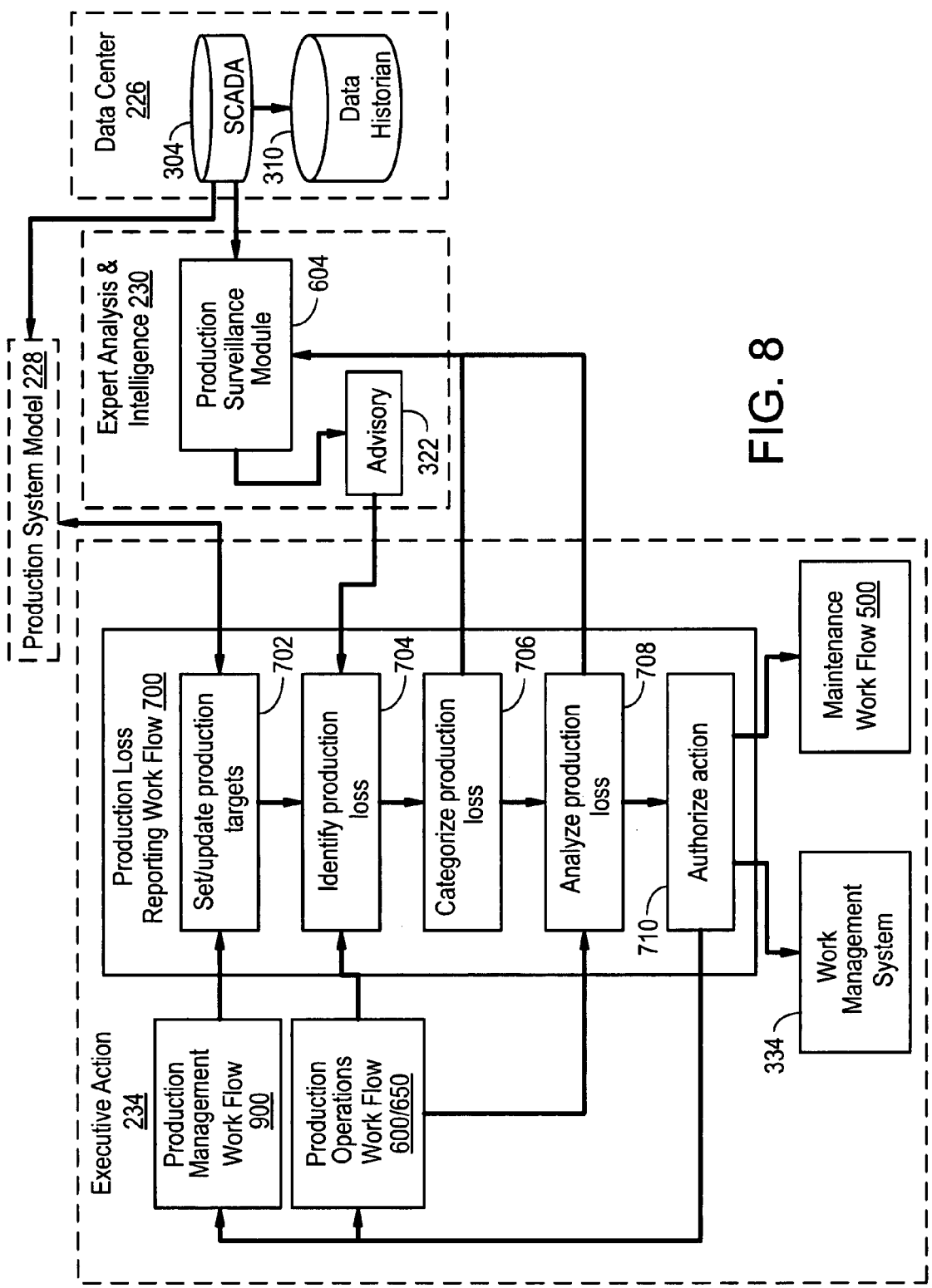
FIG. 8 is a flow diagram depicting operation of an illustrative orchestrated production loss reporting work flow of the illustrative production management system of FIG. 2A.

FIG. 8 depicts an illustrative orchestrated production loss reporting work flow 700 that operates to track production loss over time and mitigate the loss thereby increasing, and in some instances maximizing, the actual production 120. The illustrative production loss reporting work flow 700 may be implemented as software and/or hardware operating in the executive action module 232 interfacing with other components of the system 200 to drive operations of the work flow 700. The production loss reporting work flow 700 operates in a supervisory capacity over an existing operational objective that governs the operation of one or more of the well and infrastructure 204 and the processing and transport system 206.

At operation 702, production targets are set. The production targets represent desired production from the reservoirs 202, wells 204 and processing and transport system 206, and in certain instances are derived from the operating potential 114. In certain implementations, the production targets may be derived from the operating potential 114 adjusted for an expected efficiency of the reservoirs 202, wells 204 and processing and transport system 206. The production targets are set with information received from the production system model 228. In such embodiments, the production system model 228 determines the operating potential 114 from current production data 412 received from the SCADA 304 and historic production data 412 received from the data historian 310. The production targets can be set automatically, or can be set with input from a decision-maker via the collaborative decision-making module 232. The production loss reporting work flow 700 drives the setting of production targets by automatically prompting components of the system 200 (including the production system model 228), as well as the decision-maker in performing their parts in setting the production targets at operation 702.

At operation 704, production losses are identified. Production loss can be identified in a number of ways. For instance, the operation of the reservoirs 202, the wells 204, and/or the processing and transport system 206 may be monitored via the production data 412 and compared against the production targets to determine whether the operation is meeting the production targets. Such comparison, and other comparisons to determine production loss, are monitored by the production surveillance module 604 and identified via an advisory through the advisory module 322. The production surveillance module 604 receives current production data 412 via the SCADA 304 and historic production data 412 via the data historian 310. The advisory may include not only an indication of the production loss, but also its magnitude and possible reasons for the resulting capacity gap 116.

At operation 706, the production losses are categorized by the cause of the production loss. For example, the production loss may be categorized as deriving from degradation in performance (i.e. a performance gap 108), lack of availability (i.e. and availability gap 112), failure of components and subcomponents to be optimally adjusted (i.e. capacity gap 116), or other. The category of loss is communicated to the production surveillance module 604 and accounted for in further operations to identify production loss.

At operation 708, the production losses are analyzed to determine whether the production loss is an anomaly, unlikely to occur again, or whether the production loss is an ongoing, and in some instances increasing, loss. In analyzing the production losses, the analysis may look to historical data trends to note that the production loss is reoccurring, and increasing or decreasing. If it is determined that the production loss is reoccurring, the analysis at operation 708 may automatically determine or facilitate determining (with input of a decision-maker) one or more possible actions to remedy the production loss and proceed to operation 710.

At operation 710, an action to remedy the production loss is authorized. The action may be one or more of the actions recommended in operation 708, or may be another action. The action may be authorized automatically, or may be authorized by or with input from a decision-maker via the collaborative decision-making module 232. In some instances, the authorized action may involve operation of the maintenance work flow 500, for example to update performance standards (operation 502), update maintenance strategies (operation 506), update maintenance routines (operation 508), update maintenance schedules (operation 510), or other. In some instances, the authorized action may involve operation of the production operations work flow 600/650, for example to perform operations 606-612. In some instances the action may involve operation of the production management work flow 900 to update the production targets at operation 702. In some instances, the actions may involve initiation of work via the work management system 334 or maintenance activities via the maintenance work flow 500.

Some or all of the operations 702-710 can be performed automatically, enabling management by exception from the decision-makers. The operations may be performed continuously or substantially continuously, periodically in regular and/or irregular intervals, or sometimes continuously or sometimes periodically. Different operations can be performed at different rates. In certain instances, the operations are performed in real time. As discussed above, if the data is collected continuously or substantially continuously, in rapid enough time intervals (depending on the type of data), or is real time data, the production loss reporting work flow 700 can operate to identify production enhancement opportunities, and can take corrective action substantially concurrently with the changes in the actual production 120.

Figure 9:
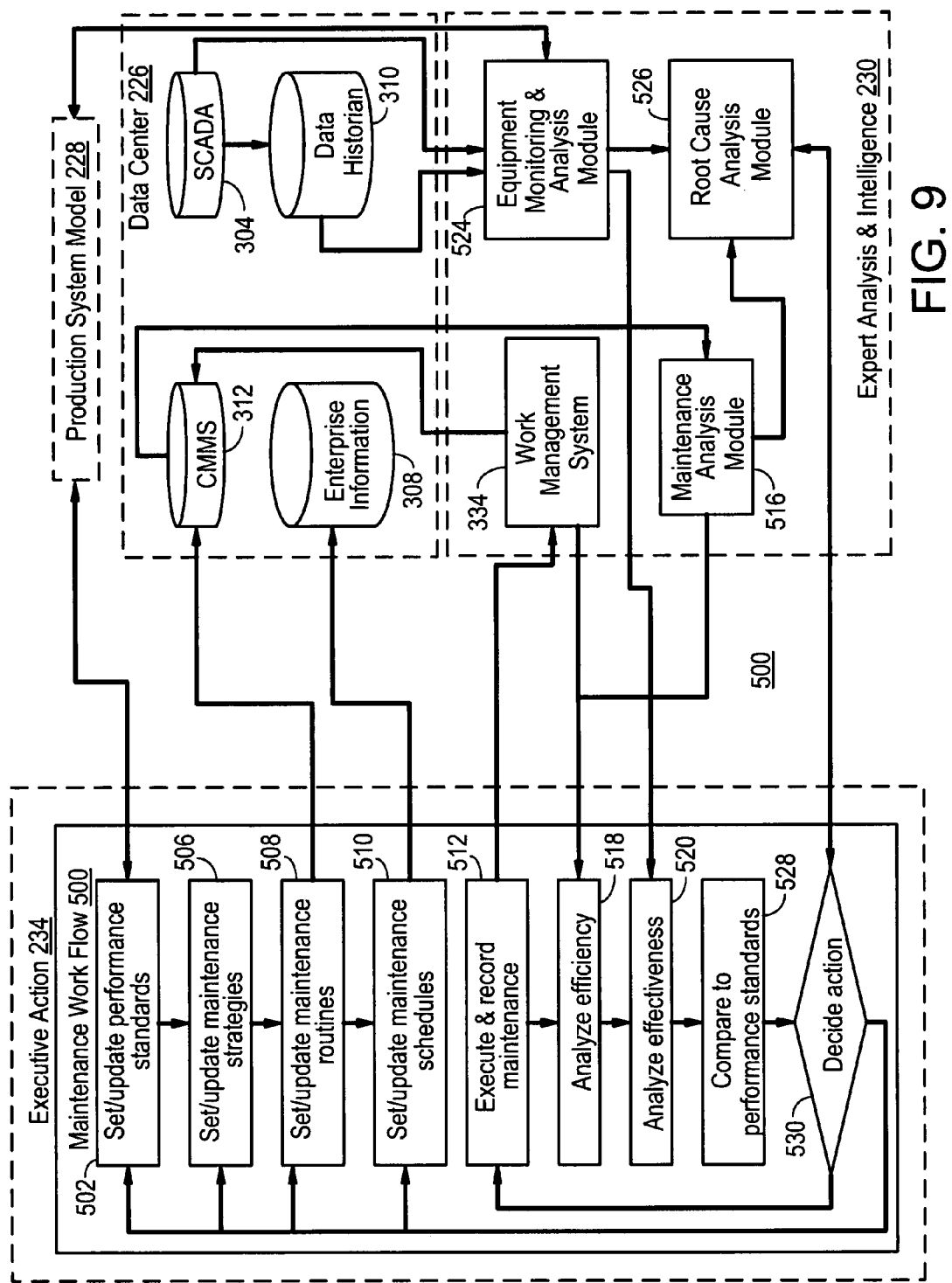
FIG. 9 is a flow diagram depicting operation of an illustrative orchestrated maintenance work flow of the illustrative production management system of FIG. 2A.

Turning now to FIG. 9, an illustrative maintenance work flow 500 that operates to increase, and in some instances maximize, the available potential 110 and operating potential 114 is schematically depicted. By increasing or maximizing the available potential 110 and operating potential 114, the performance gap 108 and availability gap 112 are reduced or minimized. The illustrative maintenance work flow 500 may be implemented by software and/or hardware operating in the executive action module 232 interfacing with other components of the system 200 to drive the operations of the work flow 500. In the illustrative maintenance work flow 500, performance standards are set at operation 502. The performance standards represent desired performance of the reservoirs 202, wells 204 and processing and transport system 206, and in certain instances are representative of the installed potential 106. The performance standards are set with information received from a maintenance and reliability modeling aspect of the production system model 228. In certain embodiments, the production system model 228 can be used to identify the installed potential 106 and determine the mean time between failure and meantime to repair or preventative intervention of the components and subcomponents of the upstream production system and modifies the installed potential 106 in setting the performance standards. The performance standards can be set automatically by the production system model 228, or can be set by or with input from a decision-maker with information from the production system model 228. In the instance where the decision-maker participates in setting performance standards, information from the production system model 228 is communicated to the decision-maker via the collaborative decision-making module 232. Likewise, the performance standards are communicated from the decision-maker via the collaborative decision-making module 232. Additionally, the decision-maker can have access to other components of the system 200, for example the data center 226, via the collaborative decision-making module 232 for reference in setting the performance standards. The maintenance work flow 500 drives the setting of performance standards by automatically prompting components of the system 200 (including the production system model 228), as well as the decision-maker in performing their parts in setting the performance standards in operation 502.

At operations 506-510 the maintenance plan for maintaining the upstream production system is set. Specifically, at operation 506, maintenance strategies are set. At operation 508 maintenance routines are set. The maintenance routines are automatically communicated to the computerized maintenance and management system (CMMS) 312. At operation 510 maintenance schedules are set. The maintenance schedules are automatically communicated to the enterprise information system 308. The maintenance strategies, maintenance routines and maintenance schedules relate to one or more of the reservoirs 202, the wells 204, and the processing and transport system 206. As above, the maintenance strategies, maintenance routines, and maintenance schedules can be set automatically, or can be set by or with input from a decision-maker with information communicated via the collaborative decision-making module 232. The illustrative maintenance work flow 500 drives the operations 506-510 by automatically prompting components of the system 200, as well as the decision-maker, in performing their parts of the operations.

At operation 512 the maintenance is automatically executed on the reservoirs 202, the wells 204 and the processing and transport system 206 and information concerning the maintenance is recorded. The execution and recording of maintenance is performed via a work management work flow 800 and a work management system 334. The work management work flow 800. The work management system 334 is driven by the work management work flow 800 to implement the maintenance. The work management system 334, as discussed above, operates in coordinating scheduling, assignment of personnel, work orders and other aspects of implementing the maintenance. The work management system also automatically reports to the CMMS 312 regarding the scheduling, the personnel, the work orders, the status complete, and the actions taken in implementing the maintenance.

At operation 518 the work flow 500 drives analysis of the efficiency of the maintenance operations by prompting the work management system 334 and the maintenance analysis module 516 for information on the efficiency. The efficiency analysis determines in general to what degree the maintenance plan (i.e. maintenance strategy, maintenance routines and maintenance schedules) is being performed. The maintenance analysis module 516 collects information from the CMMS 312 and determines information about the efficiency of the maintenance, for example including percent efficiency, utilization ratio, how many planned actions were taken, how many unplanned actions were taken, and other information.

At operation 520 the workflow 500 drives analysis of the effectiveness of the maintenance operations by prompting an equipment monitoring and analysis module 524 for information on the effectiveness of the maintenance operations. The effectiveness analysis determines in general to what degree the maintenance that is being performed is effective in maintaining the installed potential 106. For example, the effectiveness analysis may note that although scheduled maintenance is being performed on a component, the component still experiences frequent breakdowns. The equipment monitoring and analysis module 524 monitors current performance and condition information for equipment and components of the system 200 received from the SCADA 304 and historical performance and condition information for equipment and components of the system 200 received from the day historian 310. The equipment monitoring and analysis module 524 outputs information including mean time between failure data, mean time to repair data, and other performance data 406 and availability data 410.

At operation 528, the outputs of the efficiency analysis at operation 518 and the effectiveness analysis at operation 520 are compared to the performance standards set at operation 502. At operation 530, an action is determined in view of the comparison between the efficiency and effectiveness of the maintenance and the performance standards. If there is no significant difference between the efficiency and effectiveness of the maintenance and the performance standards, the action taken may be to continue operating under the set maintenance strategies, maintenance routines, and maintenance schedules. Accordingly, operations return to operation 512 and repeat as described above. If there is a significant difference between the efficiency and effectiveness of the maintenance and the performance standards, the action taken may be to update the performance standards, update the maintenance strategies, update the maintenance routines, and/or update the maintenance schedules. In deciding the action at operation 530, reference may be made to a root cause analysis module 526 that receives input from the equipment monitoring and analysis module 524 and the maintenance analysis module 516 to facilitate or perform root cause analysis for the disparity between the efficiency and effectiveness of the maintenance operations and the performance standards. In some instances, the action can be determined automatically. Alternately, a decision-maker via the collaborative decision-making module 232 can determine or can contribute to determining the action. If a decision-maker is involved in determining the action, one or more of information about the difference between the efficiency and effectiveness of the maintenance operations and the performance standards, possible actions determined automatically, and information from the root cause analysis module 526 can be communicated to the decision-maker via the collaborative decision-making module 232. The work flow 500 will prompt the decision-maker to determine the action, thus driving the decision-maker in his part in me operation of the system 200. Additionally, through the collaborative decision-making module 232, the decision-maker has access to other information both current and historical about the operation of the reservoirs 202, wells 204, and processing and transport system 206. Whether the action is determined automatically or with input from the decision-maker can depend on the magnitude of the difference between the efficiency and effectiveness of the maintenance operations and the performance standards, the possible root cause determined by the root cause analysis module 526, and/or other factors. Also, if the action is determined automatically, the decision-maker may review the action and determine to keep the automatically made action and/or make further or different actions via the collaborative decision-making module 232. Depending on the action decided, automatically or by the decision-maker, operations may return to one or more of operation 502 to update performance standards, operation 506 to update maintenance strategies, operation 508 to update maintenance routines, and/or operation 510 to update maintenance schedules. Once an action has been implemented, the system 200 can operate to track changes in the operation of the reservoirs 202, the wells 204, the processing and transport system 206, and the system 200 to associate the changes with the respective actions that caused them. In this way, the system 200 enables analysis of the actions to see whether they were successful in realizing the enhancement opportunities.

Of note, some or all of the operations 512-530 can be performed automatically, enabling management by exception from the decision-makers. The operations may be performed continuously or substantially continuously, periodically in regular and/or irregular intervals or sometimes continuously and sometimes periodically. In certain instances, one or more of the operations are performed in real time. As discussed above, if the data is collected continuously or substantially continuously, in rapid enough time intervals (depending on the type of data), or is real time data, the maintenance work flow 500 can operate to determine differences between the efficiency and effectiveness of the maintenance operations and the performance standards, and can take corrective action substantially concurrently with the effects of the maintenance operations on the available potential 110 and operating potential 114. For example, if it is determined that a planned action was not implemented, substantially immediate action can be taken to reschedule the action at operation 510. In another example, it may be determined that the operation of a component or equipment is indicative of a pending or occurring failure, and substantially immediate action can be taken to initiate a corrective action at operation 510.

Figure 10:
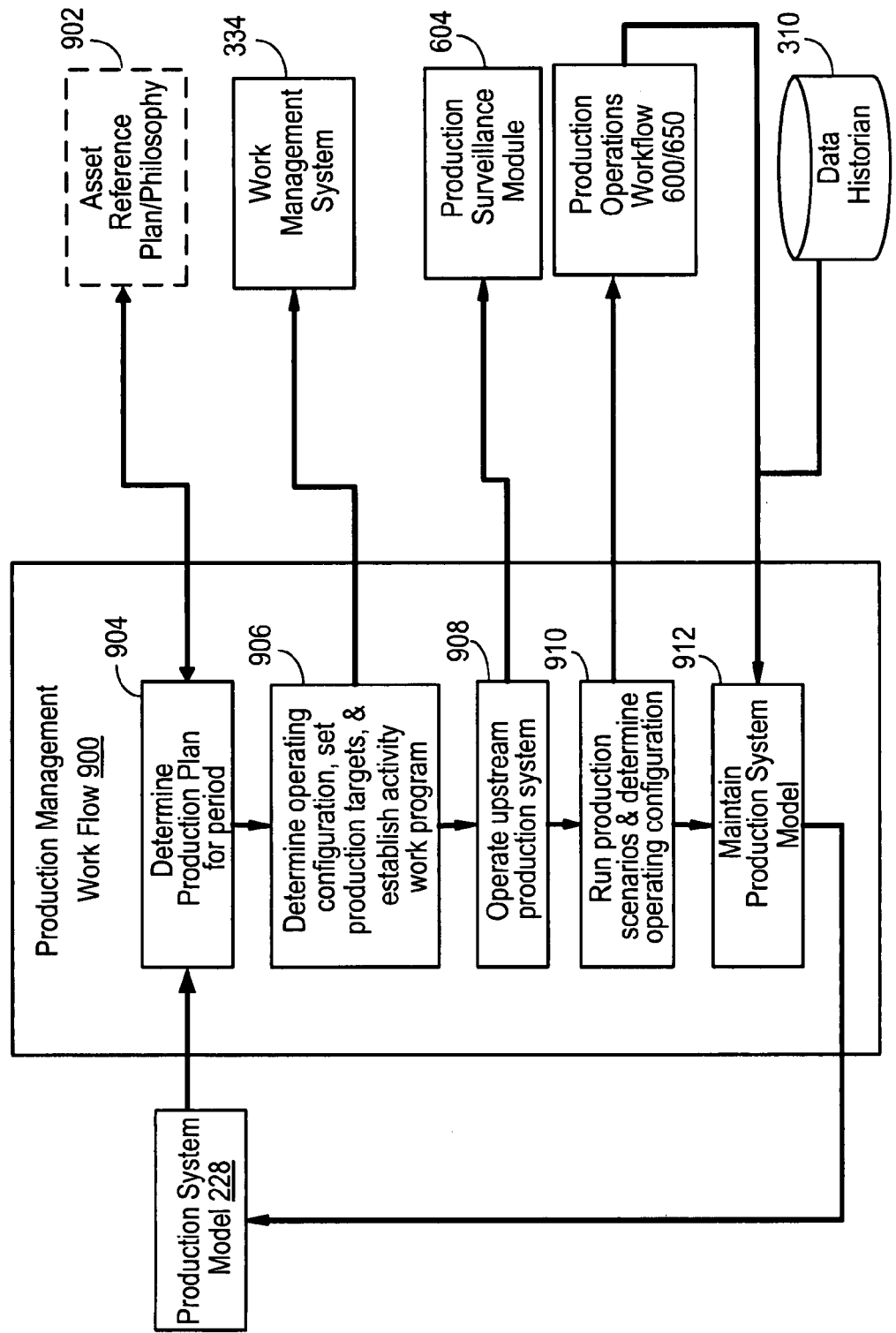
FIG. 10 is a flow diagram depicting operation of an illustrative orchestrated production management work flow of the production management system of FIG. 2A.

Referring now to FIG. 10, an illustrative productions management work flow 900 that operates to manage the production operations of the upstream production system is schematically depicted. In exploiting an upstream production system, a high level production system (or asset) reference plan/philosophy 902 is developed that outlines, at a high level, the goals and general philosophy under which the upstream production system is going to be operated. For example, the plan/philosophy 902 may outline that the upstream production system will be operated to exploit available or assumed viable reserves by within particular reservoirs or zones, producing a specified rate of production over a number of years, will be designed and/or operated at a particular capacity, the developed or the assumed product characteristics, the critical economic factors and assumptions consistent with the investment decision, the staffing levels and operating expenditure. These assumptions and parameters often change over the life of the upstream production system and may impact the production model or production system objectives and constraints.

At operation 904, a more directed production plan pertaining to a subset of the planned upstream production system lifespan, for example a year, is determined using the production system model 228 in view of production system reference plan/philosophy 902. In certain instances, the production plan may set one or more of operational objectives, assumed economic factors, operating expenditures available, capital investment projects. These assumptions and parameters often change over the period of the production plan and may impact the production model or production system objectives and constraints. At operation 906, using the determined production plan, work actions that will be performed over the life of the upstream production system are set. The work actions are intended to maintain the upstream production system, operate and maintain components and equipment. The initial work actions are communicated to the work management system 334 that coordinates implementing the initial work actions as discussed above. Production targets for the upstream production system are also set, for example, for use in production loss reporting (e.g. in work flow 700). Using production system model 228, initial control set points are determined for the operation of the upstream production system and implemented.

At operation 908, the upstream production system is operated initially based on the control set points and work actions determined in operation 906. Data about the operation of the upstream production system is communicated to the production surveillance module 604. Thereafter, at operation 910, operational scenarios are run against the upstream production system model 228 to determine the control settings and the control settings implemented in accordance with the production management work flows 600/650. At operation 912, the production system model 228 is maintained, for example, as described in the model update 680.

The illustrative workflows described with reference to FIGS. 4-10 are provided for example sake, and one or more or all of the work flows can be changed or omitted. One or more or all of the illustrative workflows can be performed at least partially concurrently or at different times, in any order or in no order. Moreover, one or more of the steps of the illustrative workflows can also be changed or omitted. One or more or all of the steps within a given illustrative workflow can be performed at least partially concurrently or at different times, in any order or in no order. In certain instances, the point of sale is prior to a refinery where the product is further processed from crude or raw products into end or near end products such as gas, diesel, heating oil, and/or liquefied petroleum gas (LPG).

Some of the illustrative systems and methods described above enable sustained upstream production system wide improvements, and in some instances optimization, of operations to extract, process and transport product from one or more reservoirs to one or more points of sale. In these illustrative systems and methods, closed loop systems operate repeatedly to manage, and in some instances maximize, the performance of one or more of the reservoirs, the wells and infrastructure, and the facilities, the availability of equipment, materials, and personnel, and/or the operation of the reservoirs, the wells, and the processing and transport system.

Some of the illustrative systems and methods described above integrate data and analysis across the reservoirs, the wells and infrastructure, and the processing and transport system. Such integrated data and analysis enables access to information that is normally not accessible together, as well as accounting for the impact of actions on one or all of the reservoirs, the wells and infrastructure and the processing and transport system. The unique access to data from across the upstream production system enables the decision-makers to identify synergies between operations of the reservoir, the wells and infrastructure, and the processing and transport system. The ability to account for the impact of actions on one or all of the aspects of the upstream production system enables more informed decisions on actions to realize enhancement opportunities.

In some of the illustrative systems and methods described above, production data, availability data and performance data is monitored and enhancement opportunities identified automatically. Such monitoring allows decision-makers to manage by exception, i.e. only respond when their input is needed. Furthermore, in some instances, actions can be determined automatically, further increasing the decision-makers' ability to manage the upstream production system by exception.

In some of the illustrative systems and methods described above, actions taken to realize enhancement opportunities are tracked from identification of the enhancement opportunity through to the changes resulting from the implementation of the action. By tracking the enhancement opportunities, actions and resulting changes, changes can be attributed to the actions taken, and it can be determined whether the action was successful (and/or how successful) in realizing the enhancement opportunity.

In some of the illustrative systems and methods described above, dynamic workflows are implemented to drive management of the upstream production system. By driving management of the upstream production system, lag times between operations in managing the upstream production system are reduced, confusion stemming from determining the next step is eliminated, and decision-makers are freed-up from time consuming low level management activities, such as regularly monitoring data for enhancement opportunities and day-to-day implementing the actions.

In some of the illustrative systems and methods described above, data is sensed and/or processed in real time allowing decision-makers and the workflows to identify and realize enhancement opportunities substantially as the enhancement opportunities occur.

A number of implementations have been described. Nevertheless, it will be understood that various modifications may be made. Accordingly, other implementations are within the scope of the following claims.

What is claimed is:

1. A computer implemented method executed by one or more processors comprising:
   receiving data about operation of a well for extracting a product from a subterranean reservoir and about operation of a processing and transport system downstream of a well head and upstream of a point of sale;
   automatically initiating and executing, using at least one processor, an adjustment to modeling of the processing and transport system continuously in response to the received data; and
   after adjustment to the modeling of the processing and transport system, automatically outputting an instruction for, in response to the received data, initiating in real time a corrective action to the processing and transport system equipment downstream of the well head.

2. The method of claim 1 wherein the processing and transport system comprises a production facility for processing the product upstream of a refinery and a gathering system for transporting the product from the well to the point of sale.

3. The method of claim 1 further including receiving data about a characteristic of the subterranean reservoir and automatically initiating and executing an adjustment to modeling of the reservoir in response to the received data.

4. The method of claim 1 further including automatically initiating and executing an adjustment to modeling of the well continuously in response to the received data.

5. The method of claim 1 wherein the data about operation of the processing and transport system comprises at least one of flow rate, pressure, temperature, or fluid composition.

6. The method of claim 1 wherein receiving the data comprises receiving the data in real time.

7. The method of claim 1 wherein adjusting the modeling comprises adjusting the modeling in real time.

8. The method of claim 1 wherein the modeling comprises at least one of first principal modeling, proxy modeling, or derived modeling.

9. The method of claim 1 further including the modeling of one or more wells and wherein the modeling of the reservoir and the modeling of one or more wells is performed by a single integrated model of at least the reservoir and at least one or more wells.

10. The method of claim 1 wherein the modeling of the reservoir, the one or more wells and the processing and transport system is performed by a single integrated model of at least the reservoir, the one or more wells and the process and transport system.

11. An article comprising a non transitory machine-readable medium storing instructions operable to cause one or more machines to perform operations, comprising:
   receiving data about operation of a well for extracting a product from a subterranean reservoir and about operation of a processing and transport system downstream of a well head and upstream of a point of sale;
   automatically initiating and executing an adjustment to modeling of the reservoir in response to the received data and automatically initiating and executing an adjustment to modeling of the processing and transport system continuously in response to the received data, and
   after adjustment to modeling of the processing and transport system, automatically outputting an instruction for, in response to the received data, initiating in real time a corrective action to the processing and transport system equipment downstream of the well head.

12. The article of claim 11 wherein the processing and transport system comprises a production facility for processing the product upstream of a refinery and a gathering system for transporting the product from the well to the point of sale.

13. The article of claim 11 further including receiving data about a characteristic of the subterranean reservoir and automatically initiating and executing an adjustment to modeling of the reservoir continuously in response to the received data.

14. The article of claim 11 further including automatically initiating and executing an adjustment to modeling of the well continuously in response to the received data.

15. The article of claim 11 wherein the data about operation of the processing and transport system comprises at least one of flow rate, pressure, temperature, or fluid composition.

16. The article of claim 11 wherein receiving the data comprises receiving the data in real time.

17. The article of claim 11 wherein adjusting the modeling comprises adjusting the modeling in real time.

18. The article of claim 11 wherein the modeling comprises at least one of first principal modeling, proxy modeling, or derived modeling.

19. The article of claim 11 further including the modeling of one or more wells and wherein the modeling of the reservoir and the modeling of one or more wells is performed by a single integrated model of at least the reservoir and at least one or more wells.

20. The article of claim 11 wherein the modeling of the reservoir and the processing and transport system is performed by a single integrated model of at least the reservoir and the process and transport system.

21. A system, comprising:
   at least one processor; and
   at least one memory coupled to the at least one processor and storing instructions operable to cause the at least one processor to perform operations comprising:
   receiving data about operation of a well for extracting a product from a subterranean reservoir and about operation of a processing and transport system downstream of a well head and upstream of a point of sale;
   automatically initiating and executing an adjustment to modeling of the reservoir in response to the received data and automatically initiating and executing an adjustment to modeling of the processing and transport system continuously in response to the received data; and
   after adjustment to the modeling of the processing and transport system, automatically outputting an instruction for, in response to the received data, initiating in real time a corrective action to the processing and transport system equipment downstream of the well head.

22. The system of claim 21 wherein the processing and transport system comprises a production facility for processing the product upstream of a refinery and a gathering system for transporting the product from the well to the point of sale.

23. The system of claim 21 further including receiving data about a characteristic of the subterranean reservoir and automatically initiating and executing an adjustment to modeling of the reservoir continuously in response to the received data.

24. The system of claim 21 further including automatically initiating and executing an adjustment to modeling of the well continuously in response to the received data.

25. The system of claim 21 wherein the data about operation of the well comprises at least one of flow rate, pressure, temperature, or fluid composition.

26. The system of claim 21 wherein receiving the data comprises receiving the data in real time.

27. The system of claim 21 wherein adjusting the modeling comprises adjusting the modeling in real time.

28. The system of claim 21 wherein the modeling comprises at least one of first principal modeling, proxy modeling, or derived modeling.

29. The system of claim 21 further including the modeling of one or more wells and wherein the modeling of the reservoir and the modeling of one or more wells is performed by a single integrated model of at least the reservoir and at least one or more wells.

30. The system of claim 21 wherein the modeling of the reservoir and the processing and transport system is performed by a single integrated model of at least the reservoir and the process and transport system.

* * * * *

UNITED STATES PATENT AND TRADEMARK OFFICE
CERTIFICATE OF CORRECTION

| | |
|---|---|
| PATENT NO. | : 8,195,401 B2 |
| APPLICATION NO. | : 11/625141 |
| DATED | : June 5, 2012 |
| INVENTOR(S) | : Richard G. Ella |

It is certified that error appears in the above-identified patent and that said Letters Patent is hereby corrected as shown below:

In the Claims:

In column 31, claim 3, line 47, after "reservoir" insert -- continuously --.

In column 32, claim 11, line 15, delete "data," and insert -- data; --, therefor.

In column 32, claim 11, line 16, after "adjustment to" insert -- the --.

Signed and Sealed this
Thirty-first Day of July, 2012

David J. Kappos
*Director of the United States Patent and Trademark Office*